US012670041B2

(12) United States Patent
Schnurr et al.

(10) Patent No.: US 12,670,041 B2
(45) Date of Patent: Jun. 30, 2026

(54) REALTIME CONTEXTUAL EVENT NOTIFICATION SYSTEM

(71) Applicant: Verint Americas Inc., Alpharetta, GA (US)

(72) Inventors: Chris Schnurr, Londonderry (GB);
Brendan Killen, Londonderry (GB);
Marc Calahan, Milton, GA (US);
Duane Wright, Guildford (GB)

(73) Assignee: Verint Americas Inc., Alpharetta, GA (US)

( * ) Notice: Subject to any disclaimer, the term of this patent is extended or adjusted under 35 U.S.C. 154(b) by 521 days.

(21) Appl. No.: 18/295,289

(22) Filed: Apr. 4, 2023

(65) Prior Publication Data

US 2023/0325261 A1     Oct. 12, 2023

Related U.S. Application Data

(60) Provisional application No. 63/328,308, filed on Apr. 7, 2022.

(51) Int. Cl.
*G06F 9/54* (2006.01)

(52) U.S. Cl.
CPC .............. *G06F 9/542* (2013.01); *G06F 9/546* (2013.01)

(58) Field of Classification Search
CPC ..... G06F 9/542; G06F 16/1734; H04L 41/06; H04L 41/0604
See application file for complete search history.

(56) References Cited

U.S. PATENT DOCUMENTS

| | | | |
|---|---|---|---|
| 8,549,629 B1 | 10/2013 | McCreesh et al. | |
| 8,782,668 B1 | 7/2014 | McCreesh et al. | |
| 8,787,532 B1 | 7/2014 | Adam | |
| 9,779,760 B1 * | 10/2017 | Ouimette ............ | H04M 3/5166 |
| 9,922,649 B1 | 3/2018 | Lore et al. | |
| 9,936,066 B1 | 4/2018 | Mammen et al. | |
| 10,147,427 B1 | 12/2018 | Johnson et al. | |
| 10,193,992 B2 * | 1/2019 | Wagenknecht ....... | H04L 67/141 |
| 10,397,740 B2 | 8/2019 | Lalka et al. | |
| 10,579,742 B1 | 3/2020 | Fernandez | |
| 11,064,072 B1 | 7/2021 | Sawala | |
| 11,178,282 B1 | 11/2021 | Ramachandran et al. | |
| 11,196,862 B1 | 12/2021 | Krebs et al. | |
| 11,509,611 B2 * | 11/2022 | Edamadaka .......... | G06Q 10/04 |

(Continued)

FOREIGN PATENT DOCUMENTS

WO     2015184359 A2   12/2015

OTHER PUBLICATIONS

Extended European Search Report issued for Application No. 23167059.7, dated Aug. 25, 2023.

(Continued)

*Primary Examiner* — Andy Ho
(74) *Attorney, Agent, or Firm* — Meunier Carlin & Curfman LLC

(57) ABSTRACT

A realtime contextual event notification system that ingests events as streams from any authorized entity applies rules to the event streams, determines a context of an end-user who is a recipient of a targeted notification, and provides notifications to the end-user in accordance with the context. The event streams may come from multiple sources and rules may be applied to provide realtime contextual information associated with the end-user.

18 Claims, 17 Drawing Sheets

(56) References Cited

U.S. PATENT DOCUMENTS

| | | | |
|---|---|---|---|
| 11,765,270 B1 | 9/2023 | Langley | |
| 2004/0054791 A1 | 3/2004 | Chakraborty et al. | |
| 2004/0128359 A1 | 7/2004 | Horvitz et al. | |
| 2004/0194110 A1 | 9/2004 | McKee et al. | |
| 2004/0194116 A1 | 9/2004 | McKee et al. | |
| 2010/0158237 A1* | 6/2010 | McCormack | H04M 3/5175 |
| | | | 379/265.06 |
| 2010/0169067 A1 | 7/2010 | Basel et al. | |
| 2011/0173620 A1 | 7/2011 | Dyer et al. | |
| 2013/0091192 A1 | 4/2013 | Shafi et al. | |
| 2013/0136253 A1 | 5/2013 | Liberman Ben-Ami et al. | |
| 2014/0208172 A1 | 7/2014 | Schnurr et al. | |
| 2014/0372544 A1 | 12/2014 | Wen | |
| 2016/0021171 A1* | 1/2016 | Zourzouvillys | H04L 69/40 |
| | | | 709/207 |
| 2016/0191709 A1 | 6/2016 | Pullamplavil et al. | |
| 2017/0288943 A1 | 10/2017 | Plumb et al. | |
| 2018/0070152 A1 | 3/2018 | Yang et al. | |
| 2018/0097768 A1 | 4/2018 | Ragsdale et al. | |
| 2019/0057079 A1 | 2/2019 | Raanani et al. | |
| 2019/0258825 A1 | 8/2019 | Krishnamurthy | |
| 2019/0265865 A1 | 8/2019 | Yaseen et al. | |
| 2019/0266611 A1 | 8/2019 | De Sousa Moura et al. | |
| 2020/0065848 A1 | 2/2020 | Gupta et al. | |
| 2020/0259948 A1 | 8/2020 | Keohane et al. | |
| 2020/0358898 A1 | 11/2020 | Singer et al. | |
| 2021/0044547 A1 | 2/2021 | Bradley et al. | |
| 2021/0306457 A1 | 9/2021 | Krishnan | |
| 2021/0350385 A1 | 11/2021 | Ellison et al. | |
| 2022/0182492 A1 | 6/2022 | Skinner et al. | |
| 2022/0270020 A1 | 8/2022 | Matula et al. | |
| 2022/0366277 A1 | 11/2022 | DeFilippo et al. | |
| 2024/0004729 A1 | 1/2024 | Workman et al. | |
| 2025/0219863 A1 | 7/2025 | Ploegert et al. | |

OTHER PUBLICATIONS

Advisory Action for U.S. Appl. No. 18/215,319, dated May 29, 2025, 03 Pages.
Final Office Action for U.S. Appl. No. 18/339,402, dated Sep. 3, 2025, 13 pages.
Non-Final Office Action for U.S. Appl. No. 18/215,319, mailed Jan. 3, 2025, 17 pages.
Notice of Allowance for U.S. Appl. No. 18/217,161, dated Aug. 27, 2025, 7 Pages.

* cited by examiner

600

| 1 | Information | | Default icon shown if iconID is zero or missing | do not show if in focus assist mode |
| 2 | Confirmation | | Displayed as success or positive reinforcement | do not show if in focus assist mode |
| 3 | Error | | Displayed for generic error | Always show |
| 4 | Warning | | Displayed for generic warning | Always show |
| 5 | Question | | Displayed for generic question | do not show if in focus assist mode |
| 6 | Overtalk | | Detected over-talk / cross talk in conversation | Always show |
| 7 | Frustrated customer | | Detected Unsatisfied customer | Always show |
| 8 | Satisfied customer | | Detected satisfied customer | Always show |
| 9 | Escalation | | Customer wishes to speak to manager | Always show |
| 10 | Latency | | Customer has been on hold for long time - apologise for wait | Always show |

*FIG. 7*

| Title | Source | Description Text | New |
|---|---|---|---|
| Complaint | RTAA | Customer is complaining, exercise empathy | Complaint — Customer may be complaining, please consider exercising empathy. Accurate? |
| Long time to respond | RTAA | Customer is on hold for too long, thank the customer for holding | Long time to respond — Customer is on hold for too long, thank the customer for holding. Accurate? |
| Frustrated Customer | RTAA | Try to relate | Frustrated Customer — Try to relate. Accurate? |
| Satisfied Customer | RTAA | Keep up the positive attitude | Satisfacted Customer — Keep up the positive attitude. Accurate? |
| Use Positive Language | RTAA | Try a positive approach | Use Positive Language — Try a positive approach. Accurate? |
| Escalation | RTAA | Seek manager assistance | Escalation — Customer is escalation, seek help from manager. Accurate? |

*FIG. 8A*

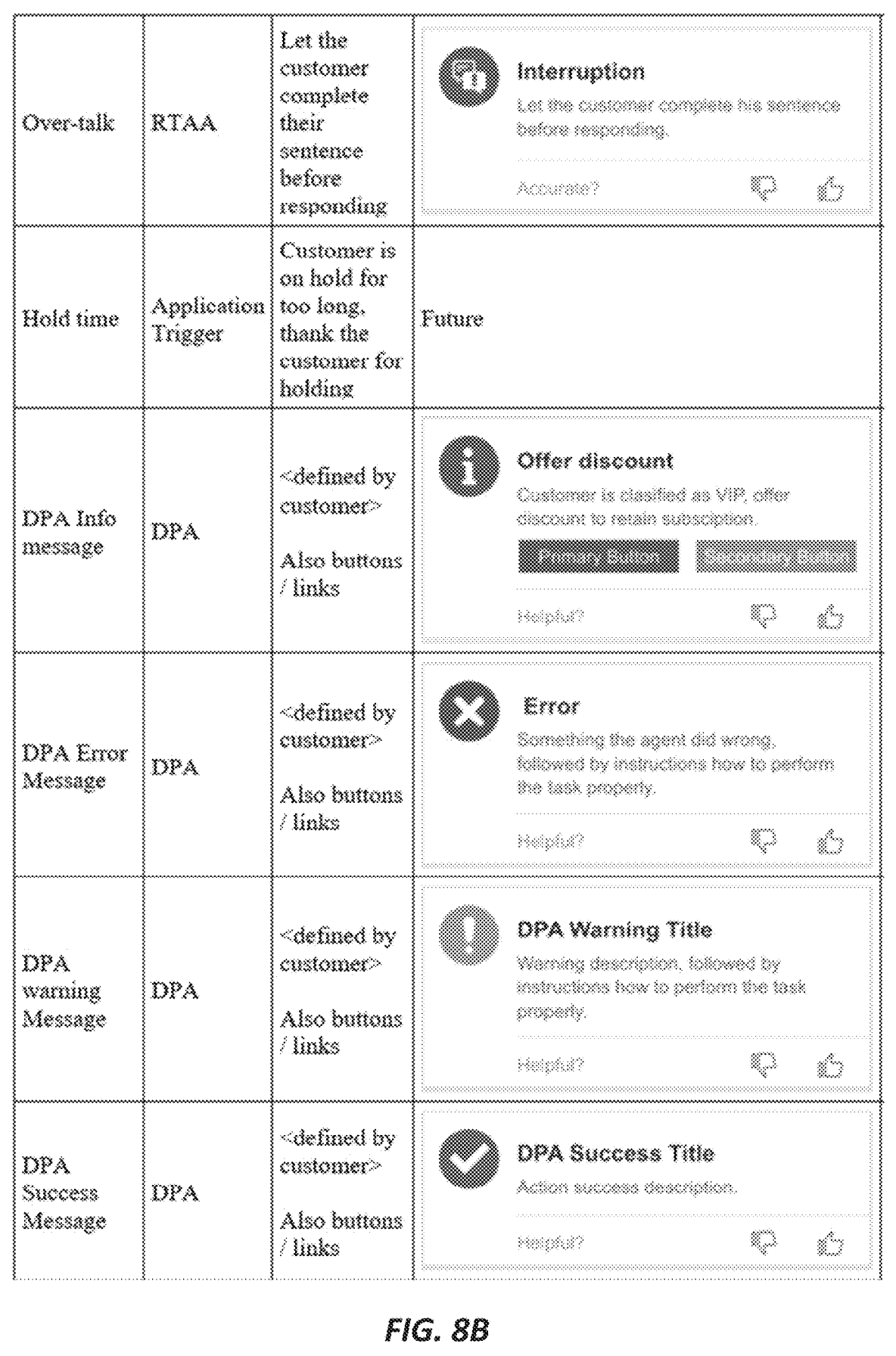

| Over-talk | RTAA | Let the customer complete their sentence before responding | |
| Hold time | Application Trigger | Customer is on hold for too long, thank the customer for holding | Future |
| DPA Info message | DPA | \<defined by customer\> Also buttons / links | |
| DPA Error Message | DPA | \<defined by customer\> Also buttons / links | |
| DPA warning Message | DPA | \<defined by customer\> Also buttons / links | |
| DPA Success Message | DPA | \<defined by customer\> Also buttons / links | |

*FIG. 8B*

Flow chart of General System
Processes

Flow chart of Source
Processes

Flow chart of Client
Processes

Receive Messages at the Client
Application from the Content
Delivery Component in Real-
Time
1202

Populate Notifications
Contained in the Messages
into User Interface
Components
1204

Display Notifications within
the User Interface
Components in Real-Time
1206

Receive Feedback on the
Notifications from the Support
Agent

1208

```
1 wa-client-app/
2 ├── ...
3 ├── src/
4 │    ├── ...
5 │    ├── pages/
6 │    │    ├── CallMentoring.jsx - Screen where the user can receive
mentoring messages
7 │    │    ├── NotFound.jsx - Not found Screen
8 │    │    └── index.js
9 │    ├── App.css - General app styles
10 │    ├── App.js - App Component
11 │    ├── UnauthenticatedApp.js - App for visitors
12 │    ├── AuthenticatedApp.js - App for loggedin users
13 │    └── index.js - Where the React SPA is loaded
14 ├── ...
```

*FIG. 14*

```
...
├── src/
│   ├── components/ - React components folder
│   │   ├── Authentication/
│   │   │   └── LogoutButton.jsx
│   │   ├── Call/
│   │   ├── Errors/
│   │   ├── Feedback/
│   │   ├── Layout/
│   │   ├── Messages/
│   │   └── index.js
...
```

FIG. 15

REALTIME CONTEXTUAL EVENT NOTIFICATION SYSTEM

CROSS-REFERENCE TO RELATED APPLICATION

This application claims priority to U.S. Provisional Patent Application No. 63/328,308, filed Apr. 7, 2022 and entitled "REALTIME CONTEXTUAL EVENT NOTIFICATION SYSTEM," the disclosure of which is incorporated herein by reference in its entirety.

BACKGROUND

Event notification systems often manage singular events using an "if this, then that" paradigm to provide prompts to users. The notifications provided by conventional systems do not account for the context of the notification; that is, they are delivered without regard to the state of the recipient or the circumstances that generated the notification.

SUMMARY

The present disclosure describes methods and systems for providing realtime contextual event notifications to an end-user, such as a support agent in a contact center. The system provides a RESTful API end point to consume realtime events from a variety of sources that supply the realtime events as streams. A managed streaming component processes the event streams by topic and context to generate notifications that are sent to the end-user in a targeted manner.

In accordance with an aspect of the disclosure, a method for providing realtime contextual event notifications is disclosed. The method may include receiving, at an API gateway, event messages from a source over a socket connection; receiving, at a recorder management system, call event messages from the source; processing, at a managed streaming component, the event messages and the call event messages to determine a context; and communicating event notifications to a client management service that determines a target client to receive the event notifications.

In accordance with an aspect, the event messages may include comprise linguistic events and application events.

The method may further include authenticating the event messages and the call event messages using a token that is contained within a header of the messages.

The method may further include processing the event messages that appear in a topic; determining a current state of a call associated with the event messages using the call event message; updating a cache with a most current event of the call; and adding the event notifications for consumption by a client management service (CMS) for delivery to the target client.

The method may further include receiving feedback on the notifications from the target client.

The method may further include receiving a connection from the target client; and sending scripting language code to the target client that define a user interface.

The method may further include receiving the event messages as parallel streams; processing the parallel streams by topic; and determining the context in realtime as the parallel streams are received.

In accordance with the present disclosure, a computer system is described that includes a memory comprising computer-executable instructions and a processor configured to execute the computer-executable instructions and cause the computer system to perform a method of providing realtime contextual event notifications. The computer system may execute instructions to receive, at an API gateway component, event messages from a source over a socket connection; receive, at a recorder management system, call event messages from the source; process, at a managed streaming component, the event messages and the call event messages to determine a context; and communicate event notifications to a client management service that determines a target client to receive the event notifications.

In accordance with an aspect, the event messages may include comprise linguistic events and application events.

The computer system may further authenticate the event messages and the call event messages using a token that is contained within a header of the messages.

The computer system may further process the event messages that appear in a topic; determine a current state of a call associated with the event messages using the call event message; update a cache with a most current event of the call; and add the event notifications for consumption by a client management service (CMS) for delivery to the target client.

The computer system may further receive feedback on the notifications from the target client.

The computer system may further receive a connection from the target client; and send scripted language code to the target client that define a user interface.

The computer system may further receive the event messages as parallel streams; process the parallel streams by topic; and determine the context in realtime as the parallel streams are received.

In accordance with yet another aspect of the disclosure, there is described a non-transitory computer readable medium comprising instructions that, when executed by a processor of a processing system, cause the processing system to perform a method of providing realtime contextual event notifications. The computer readable medium including instructions to receive, at an API gateway, event messages from a source over a socket connection; receive, at a recorder management system, call event messages from the source; process, at a managed streaming component, the event messages and the call event messages to determine a context; and communicate event notifications to a client management service that determines a target client to receive the event notifications as notifications.

In accordance with an aspect, the event messages may include comprise linguistic events and application events.

The computer readable medium may further include instructions to authenticate the event messages and the call event messages using a token that is contained within a header of the messages.

The computer readable medium may further include instructions to process the event messages that appear in a topic; determine a current state of a call associated with the event messages using the call event message; update a cache with a most current event of the call; and add the event notifications for consumption by a client management service (CMS) for delivery to the target client.

The computer readable medium may further include instructions to receive feedback on the notifications from the target client.

The computer readable medium may further include instructions to receive a connection from the target client; and send scripted language code to the target client that define a user interface.

The computer readable medium may further include instructions to receive the event messages as parallel streams; process the parallel streams by topic; and determine the context in realtime as the parallel streams are received.

In accordance with yet another aspect of the discloser, a method for providing data services through a notification application programming interface (API) is disclosed. The method may include receiving, from a client device, a message that includes event data and an authentication token; retrieving a schema to validate the message and event data, wherein the schema includes a definitions of allowed actions, data validation rules for the event data included, and data processing rules for processing the event data and authentication token; and processing the messages using the schema. The processing may include authenticating the message; validating that the event data; placing validated event data into a topic; and forwarding the validated event data to a managed streaming component.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In the drawings:

FIG. 7 illustrates example icons that may be used to convey event notifications according to certain embodiments;

FIGS. 8A and 8B illustrate example notifications that may be presented in the user interface of a client application according to certain embodiments;

FIG. 14 is an illustration of an example definition; and

FIG. 15 is an illustration of an example building block of the user interface.

DETAILED DESCRIPTION

System Overview

Modern contact centers utilize omnichannel communications to connect customers with support agents over, such as e-mails, live chat, social media, Short Message Service (SMS) messaging, and support tickets, to create a seamless user experience. Transaction history of the customer interactions over the various channels is maintained by the contact center. For example, if a customer initiates a chat session, the information from the chat session is available to a live support agent should the customer decide to ask to speak with a support agent while chatting. Customer interactions within the contact center may be viewed as a system of many parallel streams of events occurring in realtime. On their own, each event stream only describes a small fraction of the activity within the overall system, but when combined in a fully scalable and resilient manner in accordance with the disclosure hereinbelow, complex business rules may be holistically applied to the system. Further, a context may be derived from each event stream in realtime. This derived context allows for complex decisions to be made, and the associated outcomes provided to, support agents to assist in decision making in order to achieve a desirable outcome to address a customer's purpose for contacting the contact center.

Architecture Description

Figure 1A:
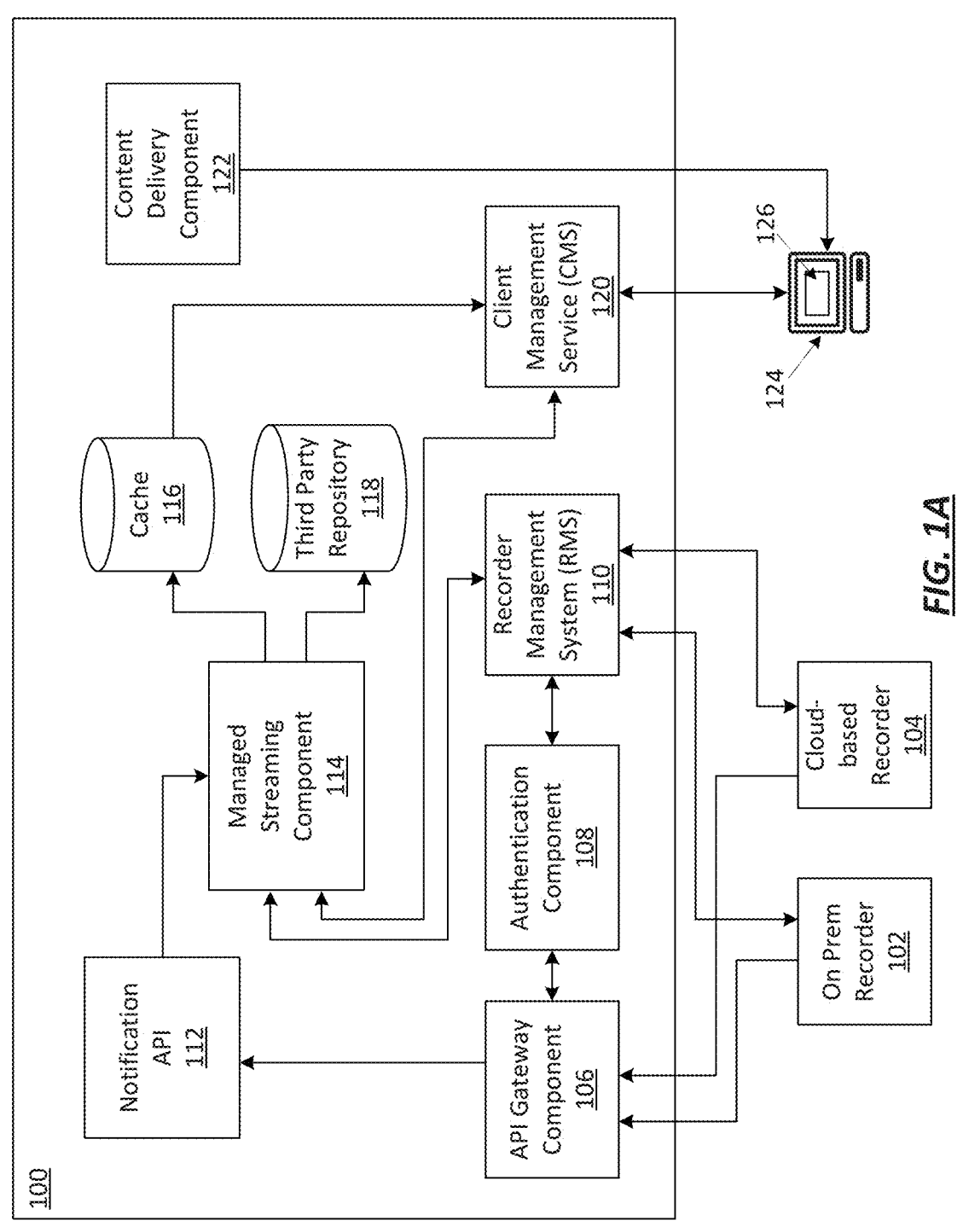
FIG. 1A illustrates an overview of the components of the realtime contextual event notification system according to certain embodiments.
Figure 1B:
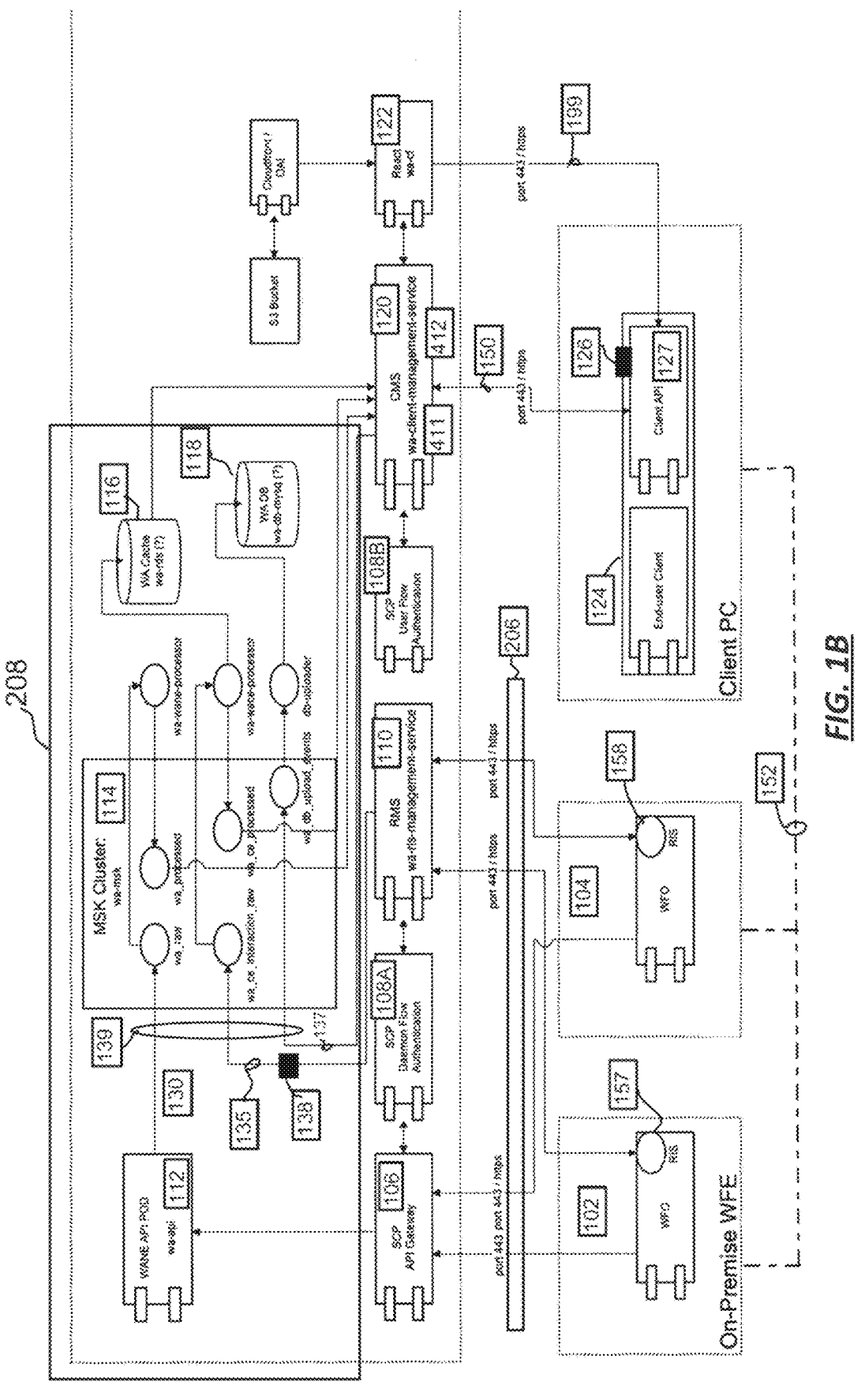
FIG. 1B illustrates an overview of the components of the contextual event notification system according to certain embodiments.

Referring to FIGS. 1A and 1B, there is illustrated an overview of a real time contextual event notification system 100, its components, services, and processes according to certain embodiments. In an implementation, the real time contextual event notification system 100 is a cloud-based real time messaging system that ingests event streams (e.g., notification events 130, call events 135, and real time call data 137 shown in FIG. 1B) as streams from any authorized entity, determines a context of a support agent and provides notifications to the support agent in accordance with the context data. The event streams may come from multiple sources, and rules may be applied to provide real time contextual event notifications that are event notifications associated with a condition or state of a user, a state of a particular call at a client device, and a circumstance that generated the event stream (for example, a support agent interaction with a customer), such as, "only show this message when the user is no longer on a phone call," "wait until the user stops editing this document before showing the next message," or "only show this information when the user starts speaking to a customer and they open a particular sub-menu and the customer has mentioned a particular key word."

Sources of event streams provided to the real time contextual event notification system 100, may include on-premises servers (for example, a recorder integration server 102 available from Verint Systems, Inc. of Melville, NY) and cloud-centric servers (for example, a cloud-based recorder server 104). The recorder integration server 102 and/or cloud-based recorder server 104 may capture call status information (call awareness data), audio (linguistic events), and screen activity (application events) associated with communications conducted between the customer and the support agent. The communications may occur on multiple channels, including but not limited to, telephone calls, wireless communications of all kinds, texts, chats, emails, voicemails, videos, teleconferences and the like. The video, audio and screen activity may be recorded so that it can be evaluated according to business needs. In an implementation, events may be messaged to the real time contextual event notification system 100 in accordance with rules applied to the source of the captured activity to provide context information for a particular call scenario, including call state awareness events, linguistic events and application events.

Linguistic events are determined, for example, not only from real time communication analysis, but also from speech-to-text transcripts of audio conversation(s) conducted between customers and support agents. If the communications are not already in textual format, in some embodiments, transcripts of the communications are analyzed by a real time analytics framework (see, FIG. 2) to identify the grouping and organization of the words and phrases spoken during calls that meet certain classification criteria. The analysis may identify themes that reveal trends and areas of opportunity or concern.

Application events are determined, for example, as a customer or support agent interacts with a user interface. For example, a user interface component may capture keystrokes, mouse clicks, screen touches, data submissions, etc. Each interaction with the user interface may be considered an application event and the real time analytics framework may use this information to determine how the customer and/or agent is interacting with an application presented in the user interface.

Call states allow the system to know the current activity on an agent communications port. When providing event notifications to an end user, the state of the call (on hold, active, terminated, etc.) can help determine what kind of notifications are useful at that point.

In an implementation, rules to manage the event notification system 100 are distributed among the various connected sources. In another implantation, the rules may be centralized within the real time contextual event notification system 100 and applied to the event messages that are received from various sources. A hybrid approach may also be used where rules are applied at the source(s) and at the real time contextual event notification system 100.

A recorder management system (RMS) 110 serves as an endpoint to which the recorder integration server 102 and/or cloud-based recorder server 104 interface connect, for example, over a socket connection. The RMS 110 assists in managing the connections of the local, on-premises recorder server 102 and/or cloud-based recorder server 104, and, together with an authentication component 108, may authenticate incoming connections, process incoming messages, validate the schema of an incoming message, and validate the data passed in the message by adding a token to each message. In non-limiting embodiments, the authentication component 108 uses a "Daemon Flow" authentication mechanism to enable the socket to be connected irrespective of the location of the recorder (i.e., on-premises or in the cloud). The RMS 110 may receive interaction and analytics events from the recorder integration server 102 and/or cloud-based recorder server 104 that are used to, for example, determine the context of an interaction between the customer and the agent.

Figure 2:
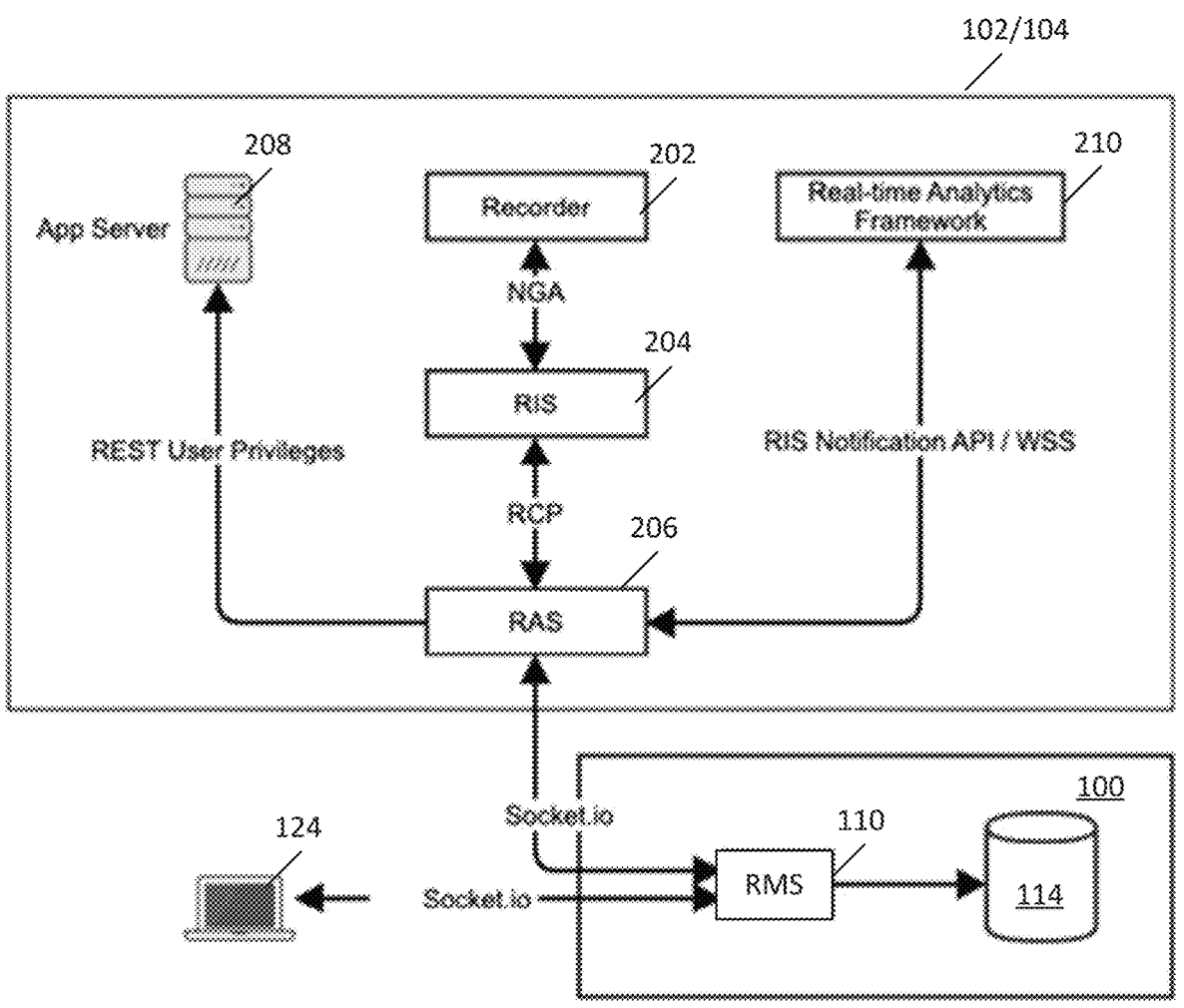
FIG. 2 illustrates additional details of the recorder integration server and cloud-based recorder and a call event API that is utilized to convey event data according to certain embodiments.

This disclosure utilizes both a web socket connection application programming interface (API) 412 and a RESTful API 112 to provide dual functionality in receiving parallel event streams according to this disclosure. As shown in FIG. 1B, real time communications data (e.g., call data) 150 is provided to a cloud-based client management service 120 via a socket network system (e.g., socket.io server 411) and web socket connection API 412. This communications data 150 may be a direct input 137 to a managed stream component 114. Also, the fact that original communications data 150 is ready to be received from an active call at the end user device 124 sets off a chain of events that allows the event notification system 100 to implement its work assist notification bus (collectively 139) with fully authenticated data. On the socket level, and shown further in FIGS. 1B and 5, the original communications data 150 is authenticated by a desktop authentication protocol as a user flow authentication 108B. As shown in FIGS. 1A, 1B, and 2, the original communications data 150 may be additionally directed to workflow enhancement operations 152 utilizing an on-premises recorder server 102 and/or cloud-based recorder server 104. The original communications data 150 that has traversed the various servers utilizes a web socket connection API 412 to initiate a Daemon Flow authentication 108A, with the goal being additional communications to the RESTful API endpoint 112 in the work assist agent server 208. In one non-limiting embodiment, the web socket connection API 412 is in communication with the client management system 120 and gives the client management server 120 access to original communications data 150 (such as raw call data 137), while the RESTful API 112 operates on application data 130, call event data 135, and linguistic inputs discussed below that are collected from an entity's recording integrations server 204 via a recording management system RMS 110.

The on-premises recorder server 102 and/or cloud-based server 102, 104 may include or be connected to respective recorder integration servers (RIS) 157, 158, referred to generally in FIG. 2 as RIS 204. FIG. 2 notably illustrates how the web socket connection API 412, and the web socket inputs and outputs may be in communication with recorder hardware, such as the RIS 204 and an associated Recorder Archive Server (RAS) 206. FIG. 2 also illustrates how the RAS may house libraries of REST user privileges that are then directed to an overall work assist agent server 208 (i.e., an agent server that provides work assist notifications and messages to an end user client computer 124). In other words, the web socket connection API 412 is tied to original communications data 150 being actively communicated to any one or all of a client management system 120, an on-premises recorder integration server 157 or a cloud recorder integration server 158 having respective recorder systems. When the web socket connection API 412 has been authenticated at the client management system 120, then the RESTful API can retrieve REST user privileges associated with that communications data 150 to initiate the Daemon Flow authentication 108A. The Daemon Flow authentication allows the work assist server 208 to implement value added computational services to make the output messages 199, delivered to each agent end user client device 124, more robust.

The recorder integration server 102 and/or cloud-based recorder server 104 communicate with an API gateway component 106 that accepts a real time events stream as event messages over a socket connection from the recorder integration server 102 and/or cloud-based recorder server 104. The event messages include the token provided by the authentication component 108. Authenticated event messages are forwarded from the API gateway component 106 to a notification API 112 that provides a RESTful API to connect the event messages to a managed streaming component 114. In particular, received event messages are added to an event bus of the managed streaming component 114 and organized by topic. This sequence is used as shown in FIG. 1B for application events and certain call events like audio and linguistic analyses. Other process could be added as developed.

The managed streaming component 114 provides services to publish (write) and subscribe to (read) streams of events, including continuous import/export of data from other systems. The managed streaming component 114 stores streams of events into a cache 116 or third-party repository 118. The managed streaming component 114 may process event streams as they occur (i.e., in real time) or retrospectively. An example managed streaming component 114 is Apache KAFKA. The managed streaming component 114 processes the received event streams by organizing the events contained therein by raw topic, for example, a category of interest by which event message data is stored and published. The managed streaming component 114 uses information contained in call event messages provided by the RMS 110 or the CMS 120 to determine a current state of a call associated with an event stream. The call state information may be provided by the recorder integration server 102 and/or cloud-based recorder server 104 to the RMS 110 during a call between the customer and the support agent. The managed streaming component 114 stores the most current event of the call(s) and event streams (event message data and call event message data) to the cache 116 by topic for consumption by a client management system (CMS) 120 for delivery to a client 124 (and/or clients as described below as 124*a*, 124*b*, 124*n*).

Figure 4:
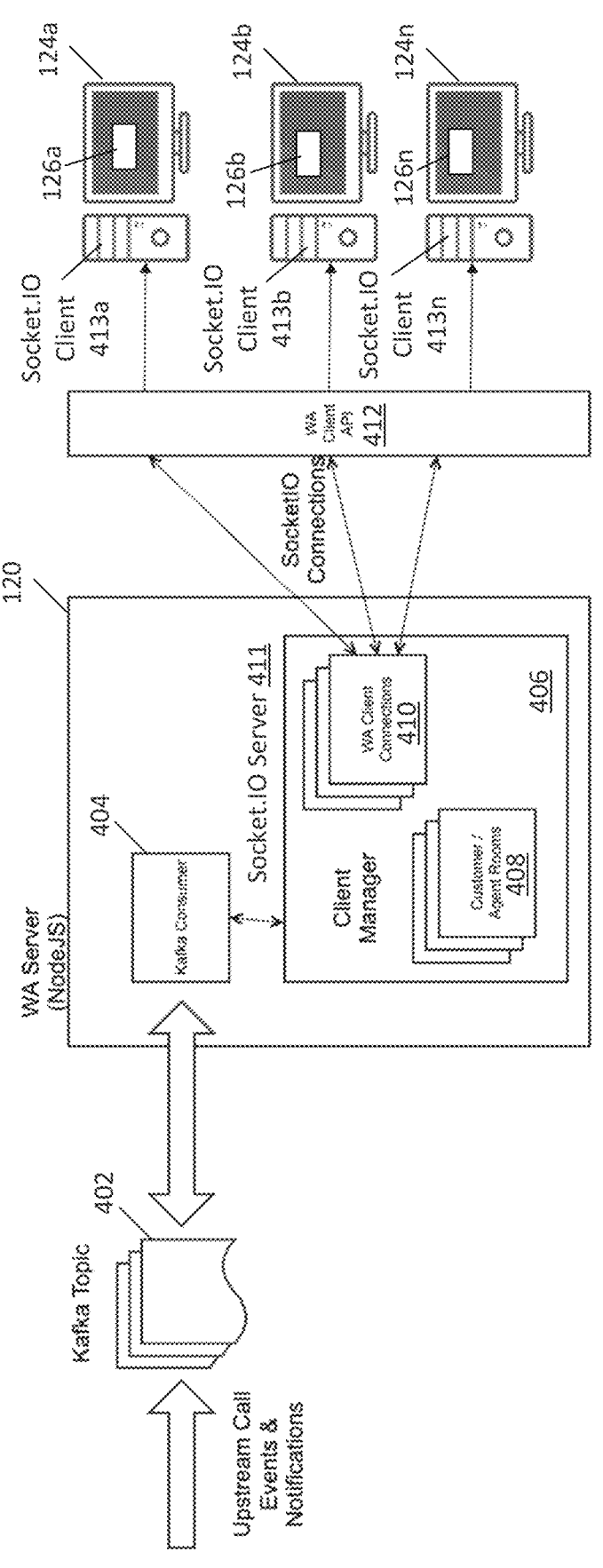
FIG. 4 illustrates a work-flow of the components within a client management service (CMS) according to certain embodiments.
Figure 5:
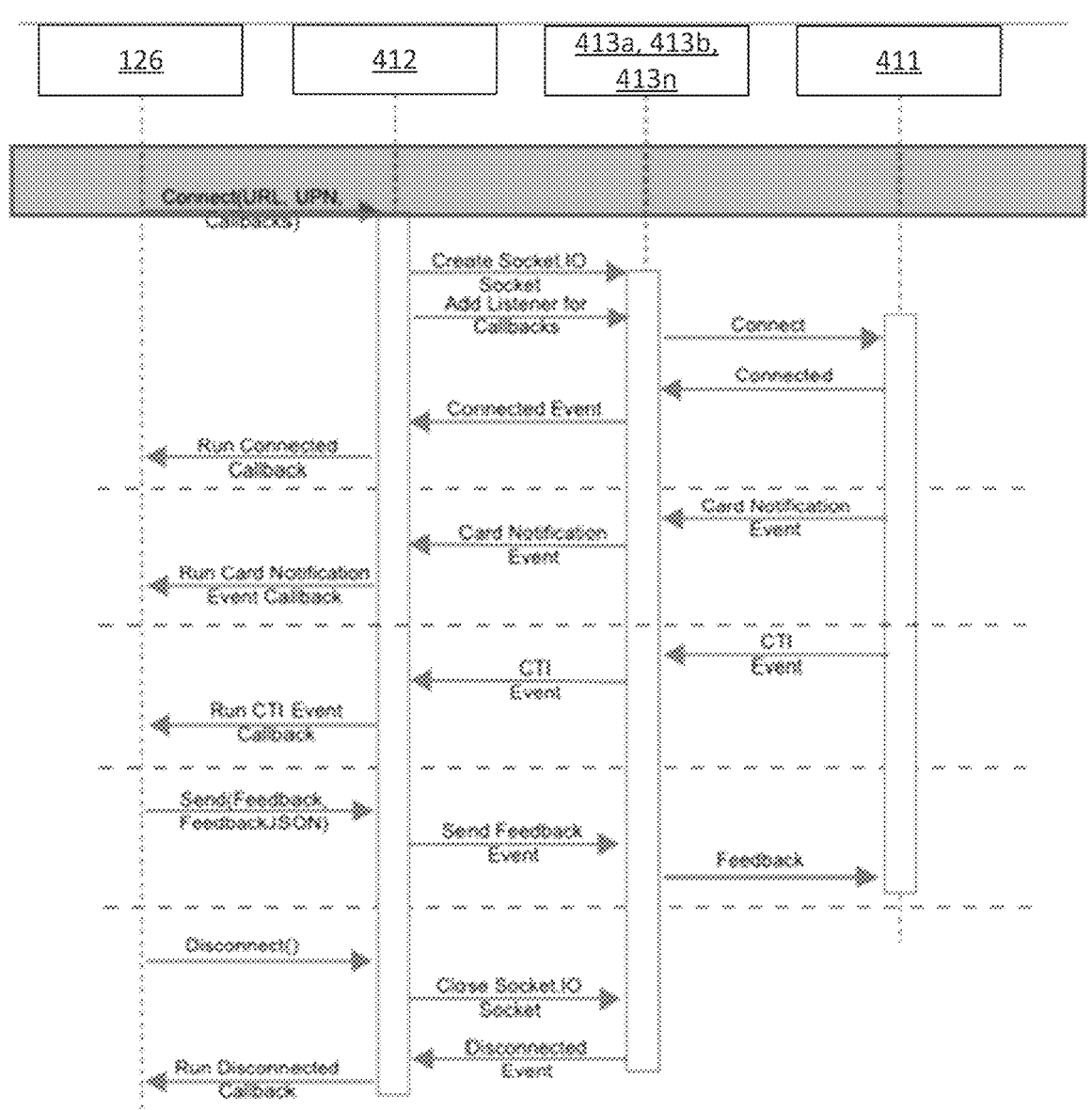
FIG. 5 illustrates a call flow diagram of communication between the components of FIG. 4 according to certain embodiments.

The CMS 120 is an API designed to wrap around Socket.IO server 411 for the handling of commands to interact with the system 100 and to receive/send events. The CMS 120 provides a flexible interface to allow third parties to the system 100 to implement their own event client application. API calls to the CMS 120 are suitably generic in that they can be extended without the need to redistribute entire new package versions. Although according to certain embodiments this package may be written in JavaScript, in other embodiments the package may be written in Dart, Coffee-Script, TypeScript, ELM, Kotlin, ClojurScript, or other web development language capable of encoding one or more features described herein. FIGS. 1B and 5 show an example of a general flow of communication between a work assist application at the work assist server 208 that communicates with a socket IO server 411. The socket IO server 411 is in communication with or housed within the client management system 120 consuming the work assist data, coaching, and notifications for display at a client device. The data from the work assist server 208 is directed to respective socket IO client connections 413 via a web socket connection API 412, that may operate at the on-premises recorder server 102 or a cloud-based recorder server 104, to provide the work assist data, coaching, and notifications to various end users 124. In a different embodiment shown in FIG. 4, the client management system 120 and the socket.io server 411 are actually connected to or housed with the work assist server 208. The placement of servers shown in the figures is not limiting of this disclosure and other arrangements are within the scope of this disclosure.

A content delivery component 122 is provided to create a user interface to be presented on a client 124. The content delivery component 122 may be provided as JavaScript libraries that are interpreted by a plugin on a client application 126 (for example, a browser) executing on the client 124 to render the user interface. The client application may be cross-platform to enable easy distribution to any client 124. Target users connect to the real time contextual event notification system 100 via a web application hosted in a native browser or desktop electron application.

With the introduction above of the various components within the realtime contextual event notification system 100, each will now be described in greater detail with reference to FIGS. 2-9.

Recorder Integration Server 102/Cloud-Based Recorder 104

With reference to FIG. 2, there are illustrated additional details of the recorder integration server 102 and cloud-based recorder 104 according to certain embodiments. A call event socket connection is utilized to convey event data from the recorder integration server 102 and cloud-based recorder 104 to the RMS 110. The call event Web socket is connected to the RMS 110 and receives an event stream from a Recorder Integration Server (RIS) 204 residing within the recorder integration server 102 and/or cloud-based recorder 104. This event stream is added to the realtime contextual event notification system 100 to allow for context provided by a call recorder 202 to be used to influence notifications provided to an agent and client interface states.

In operation, as a customer conducts a voice communication session with an agent, the call recorder 202 records audio and screen interaction data to enable search, replay, and report on calls by topic. The call recorder 202 communicates with the RIS server 204 as it records the calls and screens data. The RIS server 204 communicates to a Recording Archive Service (RAS) 206, which creates a socket connection to the RMS 110 to make the call event API call and pass event data to the system 100. The call event API is bidirectional to enable feedback and control of the RIS server 204 from client 124.

An event service within an agent server 208 is registered as a part of the startup sequence of AgentServerService. This service receives interaction and analytics events from a realtime analytics framework 210 for calls and sends them to the system 100 via a Socket.IO connection with the RMS 110. The RMS 110 is the endpoint for the RAS Socket.IO-connections. The interaction and analytics events may be derived from acoustic analytics, linguistic analytics (for example, keywords and sentiment analysis from transcripts), biometric analytics (for example, does the person on the phone match a voice print), and desktop analytics.

When the event service starts, a list of configured tenants is obtained in order to maintain segregation of data when communicating with the RMS 110. Each tenant will have its own Socket.IO connection to the RMS 110 on a 1:1 basis. Once the list of tenants is known, the event service looks for configuration to see if the event notification is configured. This information may be contained in a configuration file, for example, "INTEGRATION_FRAMEWORK-conf.xml," as shown below:

1<External>
2    <CloudConfig>
3        <EXT_VCS
xmlns="http://www.verint.com/EM/Metadata/2008/Roles/EXT_VCS"
roles instanceID="855040" role:roleName="EXT_VCS" role:Identity="211">
4            <EXT_VCS_SETTINGS>
5
    <AZURE_AUTH_SCOPE>ws://application/api/auth/.default</AZURE_AUTH_SCOPE>
6
    <WA_RL>https://RegionalURL/LoadBalance/Address</WA_URL>
7            <WA_UPN>Username</WA_UPN>
8        </EXT_VCS_SETTINGS>
9    </EXT_VCS>
10   </CloudConfig>
11 </External>

If the CloudConfig settings to successfully communicate to system 100 are not configured for any tenants, the service does not register listeners for notifications (for example, interactions and analytics events). The CloudConfig settings also contain information to pass the Verint Cloud Platform (VCP) Authentication Configuration to the correct cloud instance. The VCP Authentication Config is parsed from the SecuritySettings.xml file by obtaining the VCPAuthentication element, decoding it using base64 URL decoding, and then decrypting it using the CCL (AES256) decryption. The VCP Authentication Config is configured on a per-tenant basis, which means that each connection to the WA server has its own set of credentials.

When receiving interaction or analytics events from the realtime analytics framework 210, a map of Session ID to Tenant IDs is populated from interaction messages to allow analytics events that do not have an explicitly set Tenant ID to be sent onward using the correct socket.IOconnection. This allows a lookup of analytics events based on the Session ID. This map is cleaned up when receiving a call end interaction message.

Provided a message has a tenant, it is then checked for a user principal name (UPN). If no UPN is present, the message is unable to be sent to a client who is logged into WA and is therefore not sent. If a message does have the Tenant ID and the UPN, it is passed to the SocketIoManager in order to be sent to WA using the correct socket.IOconnection.

The SocketIoManager contains a single executor that queues the work of sending messages via the socket.IOconnection for a given tenant. On startup and on configuration refresh, the map of Tenant to Socket.IO connections is created, and the connections themselves are established. Each of these connections requires the configuration from the VCP Authentication Config. The configuration here allows for fetching of the access token that is used when creating a Socket. IOconnection to the RMS 110.

The individual connections managed by the SocketIO-Manager are contained within SocketIoConnection. These connections directly handle the communication and connection to the RMS 110. When connecting to the RMS 110, there is a two-phase connection, where an initial connection begins with very basic communication. It listens for events on the following keywords: "Connect," "tenantInformation," "disconnect," "connect_error," "reconnect," "reconnect_attempt," and "event_close". This initial connection is to establish a connection to the RMS 110 and receive the "tenantInformation." This is done by the RMS 110 parsing the authentication token and the RMS 110 responding with a tenant. Once this information has been passed back to the SocketIoConnection, the second phase commences by creating a new namespace Socket.IOconnection. Any information sent to the RMS 110 is communicated via this new tenant-based namespace socket.

Notification Event API 112

Figure 3:
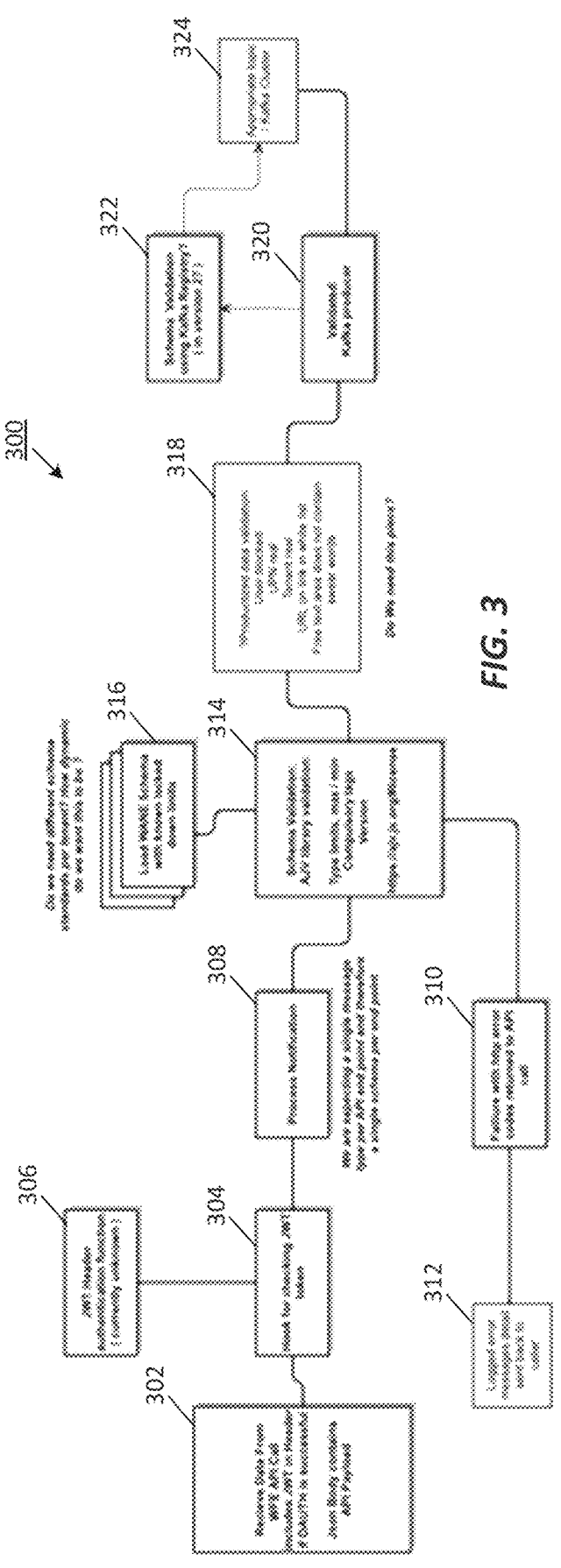
FIG. 3 illustrates the data flow associated with a notification event API according to certain embodiments.

Referring to FIG. 3, there is illustrated a description of the data flow 300 associated with the notification event API 112 according to certain embodiments. At 302, the notification API 112 receives a message from a source, for example, the recorder integration servers 102 and/or cloud-based recorder 104. The source of the message includes the authentication token in the header of the message. At 304, the token is checked by the notification API 112. An authentication function 306 is used to perform the check at 304. At 308, the message is processed. The notification API 112 assumes a single message format which is matched against a single schema at 314. The schema itself may be in the form of a JSON file and is loaded up when initializing the library prior to beginning to accept messages. In operation, the library is asked to check each incoming message and responds by giving the message object a pass/fail. For messages that fail validation, the library returns HTTP error codes to the sender at 310, and the library makes available a detailed list of the validation errors found at 312. For example, the message sender may be sent an HTTP error code 400 (BAD REQUEST) to assist in troubleshooting.

At 318, data validation is performed. The notification API 112 may check to determine if the user is blocked, UPN is real, the tenant is real, the URL on a link is on a waitlist, a free text area does not contain any swear words, etc. At 320, the validated data is sent to the managed streaming component 114, which may perform schema validation at 322. Once validated, it is determined that the message is an appropriate topic to be placed into the managed streaming component 114 for further analysis.

Below is an example non-limiting notification payload design. Other notification payload designs consistent with the teaching below are considered to be within the scope of the present disclosure and claims.

```
{
  "upn": "bob@bob.com",
  "title": "Here I am",
  "iconType": "information",
  "message": "How do you do",
```

```
    "feedback": {
        "positive": [
            "Good",
            "Great",
            "Excellent"
        ],
        "negative": [
            "Bad",
            "Awful",
            "Terrible"
        ],
        "showFeedback": true
    },
    "actions": {
        "content": [
            {
                "Google": "aHR0cDovL3d3dy5nb29nbGUuY29t"
            },
            {
                "Amazon": "aHR0CHM6Ly93d3cuYW1hem9uLmNvbQ=="
            }
        ],
        "styledAsLinks": true
    },
    "expiryDuration ": 300,
    "highlightedDuration": 30,
    "timeOfEvent": "2021-12-09T11:31:05.442Z",
    "timeEventDetected": "2021-12-09T11:31:06.225Z"
    }
],
"properties": {
    "upn": {
        "$id": "#/properties/upn",
        "type": "string",
        "format": "no-script-string",
        "title": "upn is in an email format.",
        "description": "upn is used to define what user the message goes
to.",
        "minLength": 6,
        "maxLength": 255,
        "examples": [
            "hpalumbo0@free.fr"
        ]
    },
    "title": {
        "$id": "#/properties/title",
        "title": "The title of a notification",
        "description": "Title of event for display for message.",
        "type": "string",
        "format": "no-script-string",
        "minLength": 1,
        "maxLength": 255,
        "examples": [
            "Berlin Alexanderplatz"
        ]
    },
    "iconType": {
        "$id": "#/properties/iconType",
        "type": "string",
        "format": "no-script-string",
        "title": "The icon type",
        "description": "Icon type to display on an event.",
        "default": "information",
        "enum": ["information", "confirmation", "error", "warning",
"question", "overTalk", "sadFace", "happyFace", "escalation", "clock"],
        "examples": [
            "information"
        ]
    },
    "message": {
        "$id": "#/properties/message",
        "type": "string",
        "format": "no-script-string",
        "title": "The message body",
        "description": "Content message of event to display.",
        "default": " ",
        "minLength": 0,
        "maxLength": 2000,
        "examples": [
```

-continued

```
            "Cras mi pede, malesuada in, imperdiet et, commodo vulputate,
justo,"
        ]
    },
    "feedback": {
        "$id": "#/properties/feedback",
        "type": "object",
        "title": "The feedback object",
        "description": "Used to configure the feedback of a
notification.",
        "default": { },
        "examples": [
            {
                "feedback": {
                    "positive": [
                        "Good",
                        "Great",
                        "Excellent"
                    ],
                    "negative": [
                        "Bad",
                        "Awful",
                        "Terrible"
                    ],
                    "showFeedback": true
                }
            }
        ],
        "properties": {
            "positive": {
                "$id": "#/properties/positive",
                "type": "array",
                "title": "The positive array",
                "description": "Items that will be displayed as positive
items on a notification.",
                "default": [ ],
                "items":
                    {
                        "type": "string",
                        "format": "no-script-string",
                        "minLength": 0,
                        "maxLength": 500
                    }
            },
            "negative": {
                "$id": "#/properties/negative",
                "type": "array",
                "title": "The negative array",
                "description": "Items that will be displayed as negative
items on a notification.",
                "default": [ ],
                "items":
                    {
                        "type": "string",
                        "format": "no-script-string",
                        "minLength": 0,
                        "maxLength": 500
                    }
            },
            "showFeedback": {
                "$id": "#/properties/showFeedback",
                "type": "boolean",
                "title": "The showFeedback control",
                "description": "This controls if the up and down feedback
buttons are displayed for a notification.",
                "default": true,
                "examples": [
                    false
                ]
            }
        }
    },
    "actions": {
        "$id": "#/properties/actions",
        "type": "object",
        "title": "The actions list",
        "description": "Actions that can be displayed on a notification.",
        "default": { },
        "examples": [
```

```
        {
            "actions": {
                "content": [
                    {
                        "Google": "aHR0cDovL3d3dy5nb29nbGUuY29t"
                    },
                    {
                        "Amazon": "aHR0CHM6Ly93d3cuYW1hem9uLmNvbQ="
                    }
                ],
                "styledAsLinks": true
            }
        }
    ],
    "properties": {
        "content": {
            "$id": "#/properties/content",
            "type": "array",
            "title": "The content to be listed",
            "description": "Content items that can be displayed on a
notification.",
            "default": [ ],
            "items":
                {
                    "$id": "#/properties/content/item",
                    "type": "object",
                    "title": "The content item",
                    "description": "Key value pairs of a content item
that contains a display name and a base64 encoded URL.",
                    "additionalProperties": {
                        "type": "string",
                        "format": "no-script-string"
                    },
                    "examples": [
                        "{ \"Google\":
\"aHR0cDovL3d3dy5nb29nbGUuY29t\" } "
                    ]
                }
        },
        "styledAsLinks": {
            "$id": "#/properties/styledAsLinks",
            "type": "boolean",
            "title": "The styledAsLinks controls formatting",
            "description": "Controls if a content item is display as a
link (If false item is displayed as a button).",
            "default": false,
            "examples": [
                true
            ]
        }
    },
    "expiryDuration": {
        "$id": "#/properties/expiryDuration",
        "type": "integer",
        "title": "The expiryDuration value",
        "description": "Length of time (in seconds) after which this
message becomes invalid.",
        "default": 30,
        "maximum": 3600,
        "minimum": 1,
        "examples": [
            243
        ]
    },
    "highlightedDuration": {
        "$id": "#/properties/highlightedDuration",
        "type": "integer",
        "title": "The highlightedDuration value",
        "description": "Length of time (in seconds) to display message on
WA client UX.",
        "default": 10,
        "minimum": 1,
        "maximum": 600,
        "examples": [
            35
        ]
    },
    "timeOfEvent": {
```

```
    "$id": "#/properties/timeOfEvent",
    "title": "The timeOfEvent",
    "description": "Date timestamp, UTC time event occurred at Event
Producer. If not supplied, the time the API is called will be used",
        "anyOf": [
            {
                "type": "string",
                "format": "date-time"
            },
            {
                "type": "string",
                "maxLength": 0
            }
        ],
        "examples": [
            "2021-12-09T11:31:05.442Z",
            "2021-12-09 11:31:05",
            "2021-12-09 11:31:05Z",
            "2021-12-09T11:31:05.442+01:00",
            "2021-12-09T11:31:05.442+0100",
            "2021-12-09T11:31:05.442-01:00",
            "2021-12-09T11:31:05.442-0100",
            "2021-12-09 11:31:05+01:00",
            "2021-12-09 11:31:05+0100",
            "2021-12-09 11:31:05-01:00"
            "2021-12-09 11:31:05-0100"
        ]
    },
    "timeEventDetected": {
        "$id": "#/properties/timeEventDetected",
        "title": "The timeEventDetected",
        "description": "Date timestamp, UTC time event was detected at
Event Producer.",
        "anyOf": [
            {
                "type": "string",
                "format": "date-time"
            },
            {
                "type": "string",
                "maxLength": 0
            }
        ],
        "examples": [
            "2021-12-09T11:31:05.442Z",
            "2021-12-09 11:31:05",
            "2021-12-09 11:31:05Z",
            "2021-12-09T11:31:05.442+01:00",
            "2021-12-09T11:31:05.442+0100",
            "2021-12-09T11:31:05.442-01:00",
            "2021-12-09T11:31:05.442-0100",
            "2021-12-09 11:31:05+01:00"
            "2021-12-09 11:31:05+0100"
            "2021-12-09 11:31:05-01:00"
            "2021-12-09 11:31:05-0100"
        ]
    }
}
```

Below is an example, non-limiting, structure of the notification API. Other notification API structures consistent with the teaching below are considered to be within the scope of the present disclosure and claims.

```
openapi: 3.0.1
components:
    securitySchemes:
        bearerAuth:
            type: http
            scheme: bearer
            bearerFormat: JWT
    schemas:
        notification:
            type: object
            required:
                - upn
                - title
            properties:
```

-continued

```
upn:
   type: string
   description: upn is used to define what user the message goes
to.
   minLength: 6
   maxLength: 225
   example: daniela.harvey@techco.com
title:
   type: string
   description: Title of event for display for message.
   minLength: 1
   maxLength: 255
   example: Here I am
iconType:
   type: string
   description: Icon type to display on an event.
   default: information
   enum: ['information', 'confirmation', 'error', 'question',
'overTalk', 'sadFace', 'happyFace', 'escalation', 'clock']
   example: information
message:
   type: string
   description: Content message of event to display.
   default: "\"\" "
   minLength: 0
   maxLength: 2000
   example: How do you do
feedback:
   type: object
   description: Used to configure the feedback of a notification.
   properties:
      positive:
         type: array
         description: Items that will be displayed as positive items
on a notification.
         default: [ ]
         items:
            type: string
         example: ['Good', 'Great', 'Excellent']
      negative:
         type: array
         description: Items that will be displayed as negative items
on a notification.
         default: [ ]
         items:
            type: string
         example: ['Bad', 'Awful', 'Terrible']
      showFeedback:
         type: boolean
         description: This controls if the up and down feedback
buttons are displayed for a notification.
         default: true
         example: true
   actions:
      type: object
      description: Actions that can be displayed on a notification.
      properties:
         content:
            type: array
            items:
               type: string
            example:
               - Google: 'aHR0cDovL3d3dy5nb29nbGUuY29t'
               - Amazon: 'aHR0CHM6Ly93d3cuYW1hem9uLmNvbQ=='
            default: [ ]
         styledAsLinks:
            type: boolean
            default: false
            example: true
   expiryDuration:
      type: integer
      format: int32
      description: Length of time (in seconds) after which this
message becomes invalid.
      default: 30
      maximum: 3600
      minimum: 1
      example: 300
   highlightedDuration:
```

-continued

```
          type: integer
          format: int32
          description: Length of time (in seconds) to display message on
WA client UX.
          default: 10
          minimum: 1
          maximum: 600
          example: 30
        timeOfEvent:
          type: string
          format: date-time
          description: Date timestamp, UTC time (ISO8601) event occurred.
at Event Producer. If not supplied, the time the API is called will be
used.
          example: "2021-12-09T11:31:05.442Z"
        timeEventDetected:
          type: string
          format: date-time
          description: Date timestamp, UTC time (ISO8601) event was
detected at Event Producer.
          example: "2021-12-09T11:31:05.442Z"
info:
  title: Work Assist REST APIs
  description: Service to send notification to Work Assist cloud service.
  version: "2.0"
  termsOfService: https://www.verint.com/our-company/legal-
documents/verintcom-terms-of-service/
  license:
    name: Verint Master Customer Agreement
    url: https://www.verint.com/our-company/legal-documents/end-user-
license-agreement/
  # Product Code metadata in Verint Connect Developer Portal
  x-vc-product code: <Put predefined product code metadata for Verint
Connect Developer Portal. List of available shortcodes -
https://community.verint.com/support/nt/kmp/non-technical---
processes/internal/km2244962>
  contact:
    name: API Support
    url: https://community.verint.com/support/
tags:
- name: public
servers:
  - url: https://use1.vcp.verintcloudservices.com/vcp/api/wa/
    description: Verint VCP-US-EAST
  - url: https://apse2.vcp.verintcloudservices.com/vcp/api/wa/
    description: Verint VCP-AU
security:
  - bearerAuth: [ ]
paths:
  /v2/notification:
    post:
      summary: WorkAssist API REST endpoint for sending notifications to
WA cloud.
      requestBody:
        required: true
        content:
          application/json:
            schema:
              $ref: '#/components/schemas/notification'
      responses:
        '200':
          description: Ok - message processed.
          content:
            text/html; charset=utf-8:
              schema:
                type: string
        '400'
          description: Bad request - missing message, or schema
validation failure.
          content:
            text/html; charset=utf-8:
              schema:
                type: string
        '401':
          description: Unauthorized - permissions issue,
          content:
            text/html; charset=utf-8:
              schema:
                type: string
```

-continued

```
    '500':
        description: Service unavailable - internal error.
        content:
            text/html; charset=utf-8:
                schema:
                    type: string
    '503':
        description: Service unavailable - internal error.
        content:
            text/html; charset=utf-8:
                schema:
                    type: string
    tags:
  - public
```

Notification Event API Definition

Below is the notification event API definition. In the definition, a Property is an actual event API property. A Source is where the property is added or what is responsible for the property being added before the call is received. Known types are events are internal to the recorder integration server 102 and/or cloud-based recorder 104, and the appropriate HTML rendering to be displayed can be obtained from within an internal HTML server. Unknown events are events received from an unknown source, and the rendered information is either sent without content translation or can be offloaded to a third party for translation on the fly.

The Notification Event API 112 adds raw messages to the managed streaming component 114. A streams processor (within the managed streaming component) reviews raw events, validates them and transforms them into processed events stored into a separate processed topic. The processor can include additional business logic using data from other realtime events when deciding on the appropriate transform. The events within the processed topic are consumed by the client management service. The Client API uses the events from the client management service to render the events within the user interface (FIG. 3:318, 320, 322, 324).

| Property | Source | Description | Example, notes |
|---|---|---|---|
| Version/Schema | plugin API | Version of event Producer. | this is just the endpoint of the API. Breaking change versions will use new end points |
| UserUPN | Responsibility of calling component | User Principal Name | Format: user.name@tenantCompany.com |
| TenantAuthorization | VCP Authorization token | Unique Tenant token provided by VCP which authenticates call. This can be used by Work Assist (i.e., the realtime contextual event notification system 100) internally to attribute the event to the correct tenant | generated dynamically during Azure authentication process |
| EventID | Event producer | a GUID that is produced during initial event generation that can be used to track/log the event individually across the product | |
| SourceID | Derived from XML content: Business logic in Kafka Processor | A known integer that denotes the source of the event. Future Authorized event producers will require their own known SourceID | |
| MessageType | WFE notification plugin | A known registered type (integer) that | Maps to a list of known message types and controls look and feel of message |

-continued

| Property | Source | Description | Example, notes |
|---|---|---|---|
| | | denotes the type of event being generated. This Type can be used to display Title, Icon, Heading and Messages for specific internal "known" events via localisation | |
| SourceLocale | WFO UX | ISO language code. Denotes originating language of source message. | "en-US", "es-MX", "fr-CA" |
| Title | WFO UX | Optional, string. Title of event for display | |
| IconID | WFO UX | Optional. icon ID of event to display | This ID will be one of a fixed list of Icons. If outside the bound of the icon list, the default icon is set |
| Message | WFO UX | Optional. content message of event to display. | User driven content. User is person configuring the notification at customer site |
| Feedback | Kafka Processing | Boolean to denote feedback of some kind | Inferred by feedback lists. Can be property of event in Kafka for simple markup check, but may not be needed within Event API |
| FeedbackOptionsP | WFO UX | Optional. List of Positive Feedback options to be selected | "Thanks", "Accurate", "useful", "Timely" |
| FeedbackOptionsN | WFO UX | Optional. List of negative Feedback options to be selected | "Spam", "Inaccurate", "Annoying", "Late arriving" |
| ButtonList | WFO UX | Optional. List of text to be displayed on work assist UX as buttons on message Clicking the button will attempt a new browser window open at appropriate ButtonURL | "abort", "retry", "cancel" If Work Assist is built as DPA compliant application, then DPA could fire triggers based on the buttons clicked as a cheap method of feedback and performing desktop actions |
| ButtonUrlList | WFO UX | Optional. List of target URLs to be available as buttons on work assist UX [Subject to whitelist] | "http://blah1", "http://blah2", "http://blah3", White listing within cloud configuration, although limited script injection validation is handled internally |
| ButtonAsLink | WFO UX | Boolean. Optional checkbox. | Allows render of buttons as html link instead of button |
| ExpiryTime | Event Producer | Number of seconds that elapse after which the event is irrelevant | |
| Duration | Event Producer | number of seconds the event may be displayed prominently on UX | |
| TimeOfEvent | Event Producer | datetimestamp, UTC time event occurred | Some detection systems might be able to distinguish between the time the event happened and the time the event was actually detected. Other systems may report |

-continued

| Property | Source | Description | Example, notes |
|---|---|---|---|
| TimeEventDetected | Event Producer | datetimestamp, UTC time event was detected | the same time for both of these properties |
| EventUTCOffSet | Event Producer | Timezone offset for the device where the event was detected | |
| TimeEventReceived | Work Assist API | datetimestamp, UTC time event was received by Work Assist | If this is the API facing WFE or third parties, then this event received timestamp is generated by the Work Assist server at the time it receives the API call from WFE. |
| EventPayload | Event Producer | XML source of original payload | full XML payload could be large. In initial design, the payload is sent to kafka for parsing rather than parsed within WFE notification |

Managed Streaming Component 114

The managed streaming component 114 is a distributed data store optimized for ingesting and processing streaming data in realtime. Streaming data is data that is continuously generated by the sources (for example, 102 and 104), which typically send the data simultaneously. The managed streaming component 114 processes this data and provides the functionalities of publishing and subscribing to streams of records, storing streams of records in the order in which the records were generated, and processing the streams of records in realtime. The managed streaming component 114 combines messaging, storage, and stream processing to allow storage and analysis of both historical and realtime data.

Client Management System (CMS) 120

The client management system 120 is responsible for delivering the messages provided by topic to the client application 126. The Client Management System (CMS) 120 is a client package that exposes a client API designed to wrap around Socket IO to interact with the managed streaming component 114 to receive/send events. FIG. 4 illustrates a work-flow of the components within the CMS 120 that are communicating with each other according to certain embodiments. FIG. 5 illustrates a general call flow diagram of communication between the notification application executing on the client 124 and Socket.IO Server 411 on the CMS 120 that is shown in FIG. 4 as part of the work-flow according to certain embodiments.

As shown in FIG. 4, the CMS 120 is responsible for consuming events from the managed streaming component topic, sending the events to the appropriate room 408, receiving feedback messages from room 408 as feedback data, and sending feedback messages to the topic, as shown in the sequences of FIG. 4. As shown in FIG. 4, the general work-flow is as follows. Events are delivered to a consumer 404 of the CMS 120 from the managed streaming component 114 related to a topic 402. The consumed events are forward to a client manager 406 (for example, the Socket.IO Server 411) that forwards events to the appropriate client application 126a, 126b, 126n using a respective Socket.IO Client 413a, 413b, 413n. The events are delivered using a JavaScript client API 412. Other languages noted herein may be used. The CMS 120 will also take feedback messages from the clients 124a, 124b, 124n to deliver to the topic.

The client manager 406 maintains the list of rooms 408 (i.e., connections 410). The client manager 406 stores the rooms 408 and uses this store of information to route incoming events (from the consumer 404) to the desired connections 410. New connections register with client manager 406 and the client manager 406 will create a room 408 for receiving the events from the clients 124a, 124b, 124n. An Agent ID value is used to store information in room 408. The client manager 406 also manages the lifecycle of the room 408. Each room 408 is responsible for the Socket.IO connection with its respective client 124a, 124b, 124n and contains functionality to send and receive the events from the client 124a, 124b, 124n.

FIG. 5 illustrates how the client API will be situated and used for the various use cases for sending and receiving messages from the Socket IO Server according to certain embodiments. The following general structure may be applied to message objects:

```
{
  string? apiVersion,
  string timestamp,
  object? data, <- where its contents differ from other message types
  object? error
}
```

Event types may be as follows:

```
i.WorkAssist Messages aka Mentoring Tips aka Notifications =>
   eventType: 'notificationEvent'
ii.Call Start/End/Update => eventType : 'callEvent',
   From the client 124
iii.Feedback => eventType : 'feedbackEvent',
```

Below is a non-limiting example message format definition. Other message format definitions consistent with the teaching below are considered to be within the scope of the present disclosure and claims.

```
{
Required: title, upn
upn:
   string minLength:6 maxLength:225
upn is used to define what user the message goes to.
example: daniela.harvey@techco.com
title:
   string minLength:1 maxLength:255
Title of event for display for message.
```

```
example: Here I am
iconType:
    string
Icon type to display on an event.
Default: information
Enum: information, confirmation, error, question, overTalk, sadFace,
happyFace, escalation, clock
example: information
message:
    string maxLength:2000
Content message of event to display.
Default: " "
example: How do you do
feedback:
    {
Used to configure the feedback of a notification.
positive:
[
Items that will be displayed as positive items on a notification.
string
]
example: Good, Great, Excellent
negative:
[
Items that will be displayed as negative items on a notification.
string
]
example: Bad, Awful, Terrible
showFeedback:
    boolean
This controls if the up and down feedback buttons are displayed for a
notification.
Default: true
example: true
}
actions:
    [
Actions that can be displayed on a notification.
content:
[
string
]
example: [object Object], [object Object]
styledAsLinks:
boolean
example: true
expiryDuration:
    integer (int32) minimum:1 maximum:3600
Length of time (in seconds) after which this message becomes invalid.
example: 300
highlightedDuration:
    integer (int32) minimum:1 maximum:600
Length of time (in seconds) to display message on WA client UX.
example: 30
timeOfEvent:
    string (date-time)
Date timestamp, UTC time (ISO8601) event occurred at Event Producer.
If not supplied, the time the API is called will be used.
example: 2021-12-09T11:31:05.442Z
timeEventDetected:
    string (date-time)
Date timestamp, UTC time (ISO8601) event was detected at Event
Producer.
example: 2021-12-09T11:31:05.442Z
}
```

Below is a non-limiting example message format. Other notification message formats consistent with the teaching below are considered to be within the scope of the present disclosure and claims.

```
{
"upn": "Benjamin.Keeling15@gmail.com",
"title": "Liaison AI Metal Cambridgeshire International",
"iconType": "sadFace",
"message": "Outdoors haptic connect Music Web Graphic Iowa
infomediaries Aruban synthesize",
"feedback": {
"positive": [
"harness",
"XSS",
"Peru",
"RAM",
"next-generation",
"Yen"
],
"negative": [
"invoice",
"Uruguay",
"Tasty",
"Berkshire",
"Tasty",
"process"
],
"showFeedback": true
},
"actions": {
"content": [
{
"navigate": "aHR0cDovL3JvZG9sZm8ub3Jn"
},
{
"Amazon2": "aHR0CHM6Ly93d3cuYW1hem9uLmNvbQ=="
},
{
"Cambridgeshire": "aHR0cDovL2pves5jb20="
},
{
"Goggle": "aHR0cDovL3d3dy5nb29nbGUuY29t"
}
],
"styledAsLinks": true
},
"expiryDuration": 564,
"highlightedDuration": 33,
"timeOfEvent": "2022-02-02T17:31:36.619Z",
"timeEventDetected": "2022-02-02T17:31:56.619Z"
}
```

Client Application 126

The client application 126 may include a wrapper built using, for example, the Electron chromium browser application and a React JavaScript application. As such, the client application 126 may be cross-platform and may run on various different clients 124 having different operating systems, display areas, and processors, so long as they are capable of executing a browser application. The wrapper provides operating system functionality, such as, always in focus, 'stickyness' and pass through to system notifications when minimized. The React application inside the wrapper is structured by defining components, such as screen components, user interface (UI) components and atom components. The screen components define the visible page that is displayed to an end-user (src/pages). The UI components are the building blocks of the displayed pages (src/components). The atom components are simple components not specific to event notification (src/components/atoms).

Screen Components

The screen components are components of the client application 126, which uses the various UI components as building blocks to build the screens the user sees and interacts with. An example definition is illustrated in FIG. 14.

Below is a hierarchy of the execution of the definition.

1 App: display a version of the app whether there is an authenticated user or not -continued

```
2- UnauthenticaedApp - the app for unauthenticated users
3 . LoginRedirect - displays a loading screen and redirects to MS
authentication
4 . Logout - displays a loading screen, cleans the user and redirects to
main screen
5- AuthenticatedApp - the app for authenticated users
6 - NavigationPanel - displays the available pages/screens
7    . LogoutButton - displays a button that redirects the user to the MS
Logout page
8       . Avatar - displays the user profile image or a generated one or a
default one
9 - AppRoutes - displays the selected page/screen
10 - . < screen> - displays the selected page/screen
```

Screen Components

Figure 6:
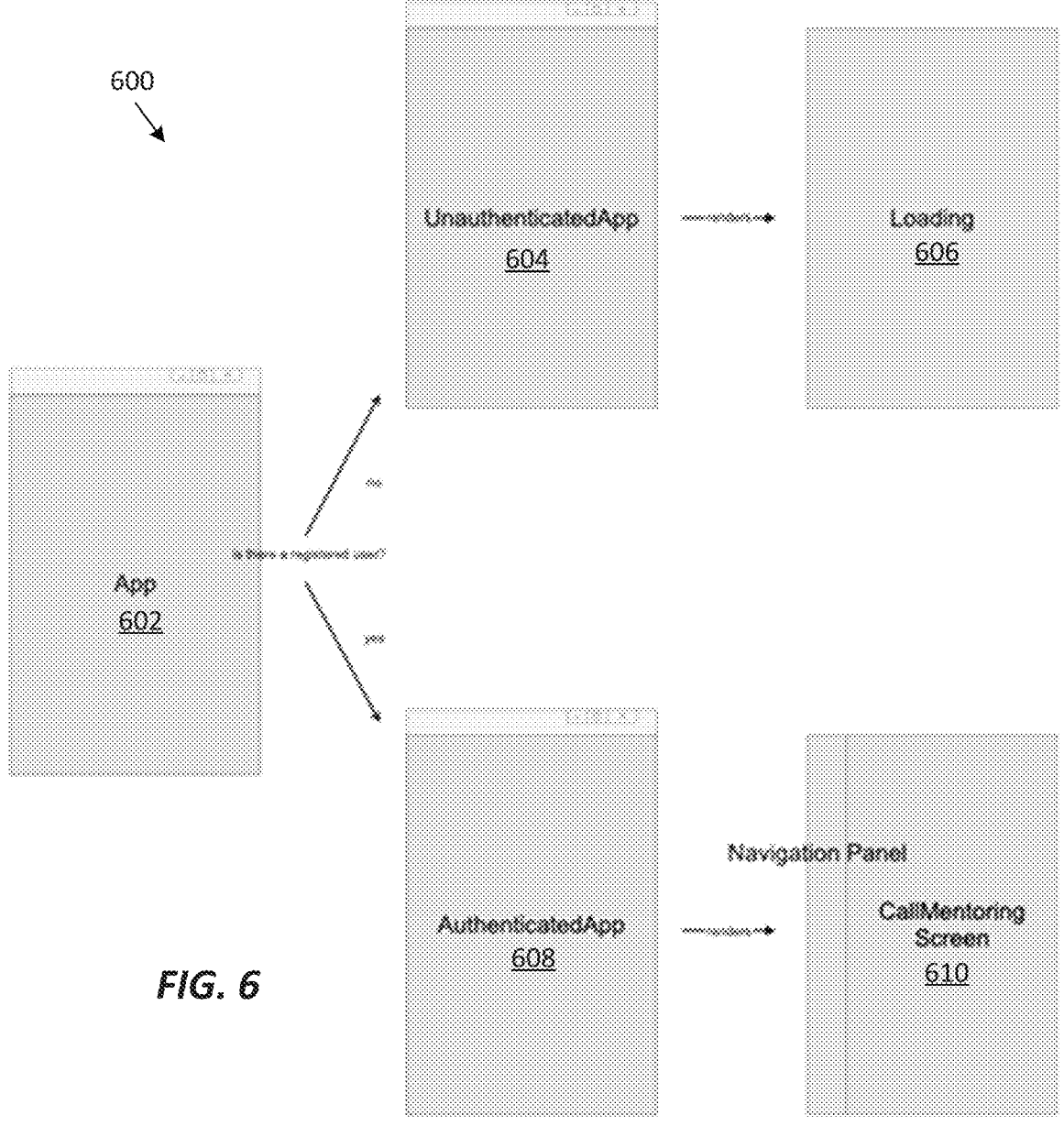
FIG. 6 illustrates an overview of the components within a client user interface according to certain embodiments.

FIG. 6 illustrates an overview of the components within a client user interface 600 according to certain embodiments. Examples of the client user interface are shown in FIGS. 8A and 8B according to certain embodiments. An App component 602 loads either an AuthenticatedApp 608 or UnauthenticatedApp 604 component, in accordance with whether the user is authenticated or not.

```
1// App.jsx (adapted)
2import { useUser } from './context/user-context';
3
4function App ( ) {
5   return user ?
6      <AuthenticatedApp user={user} />
7      :
8      <UnauthenticatedApp />;
9}
```

The UnauthenticatedApp 604 shows a login screen (Loading 606) that uses a login component so the user can gain access to the realtime contextual event notification system 100. The AuthenticatedApp 608 will load the services available to an authenticated user (for example, an AppRoutes module). The AppRoutes module loads the CallMentoring screen 610 (see FIG. 8A, 8B) of the realtime contextual event notification system. This hierarchy allows for future iterations to contain more services and more screens.

The CallMentoring screen 610 is where notifications are displayed and managed by a support agent or other end-user.

```
1- CallMentoring:
2    - CallStatus: Displays a greeting or the callerNumber and the callTime
3    . Timer: Displays a time counter, that ticks every second.
4    - MessageList: Displays a list of messages
5      * Message: Displays one message
6        . FeedbackBar: Displays the 'form' that allows the user to send
feedback
          about the received message
7        . FeedbackButton: Either displays a simple button, or a button
that opens
          up a feedback dialog
```

User Interface Components

The building blocks of the user interface are illustrated in FIG. 15.

Figure 9A:
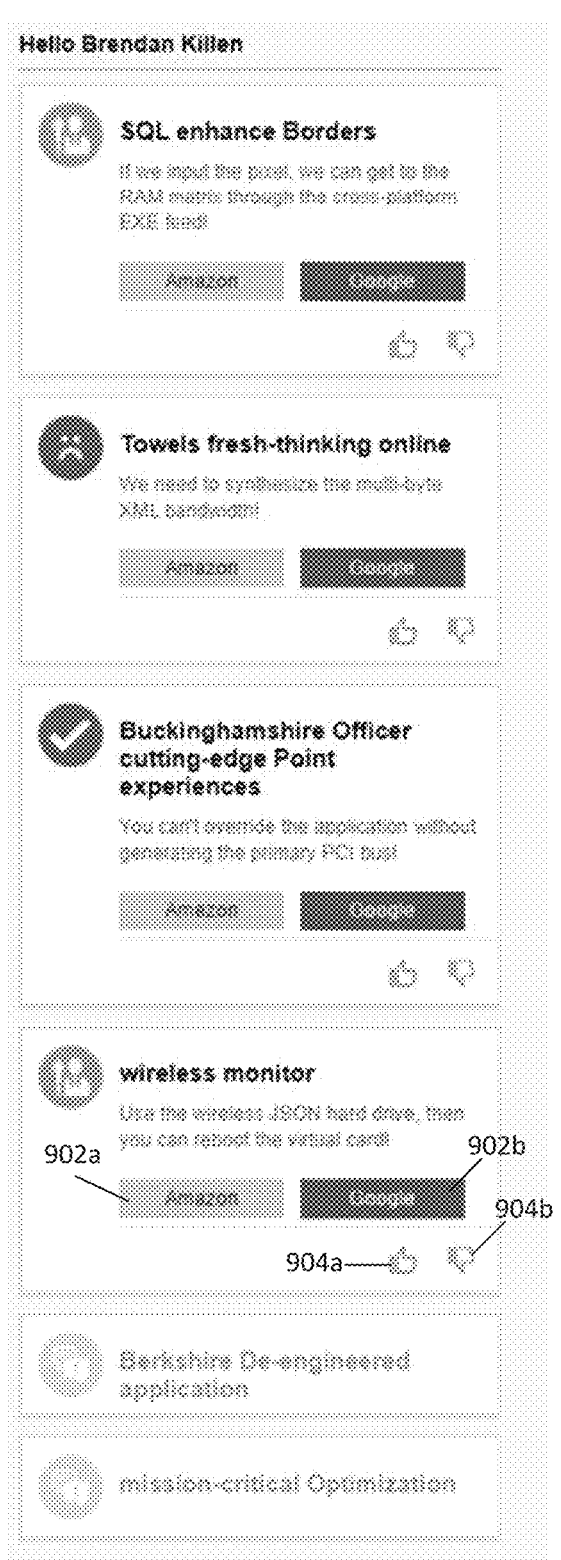
FIGS. 9A and 9B illustrate an example user interface of the client application according to certain embodiments.
Figure 9B:
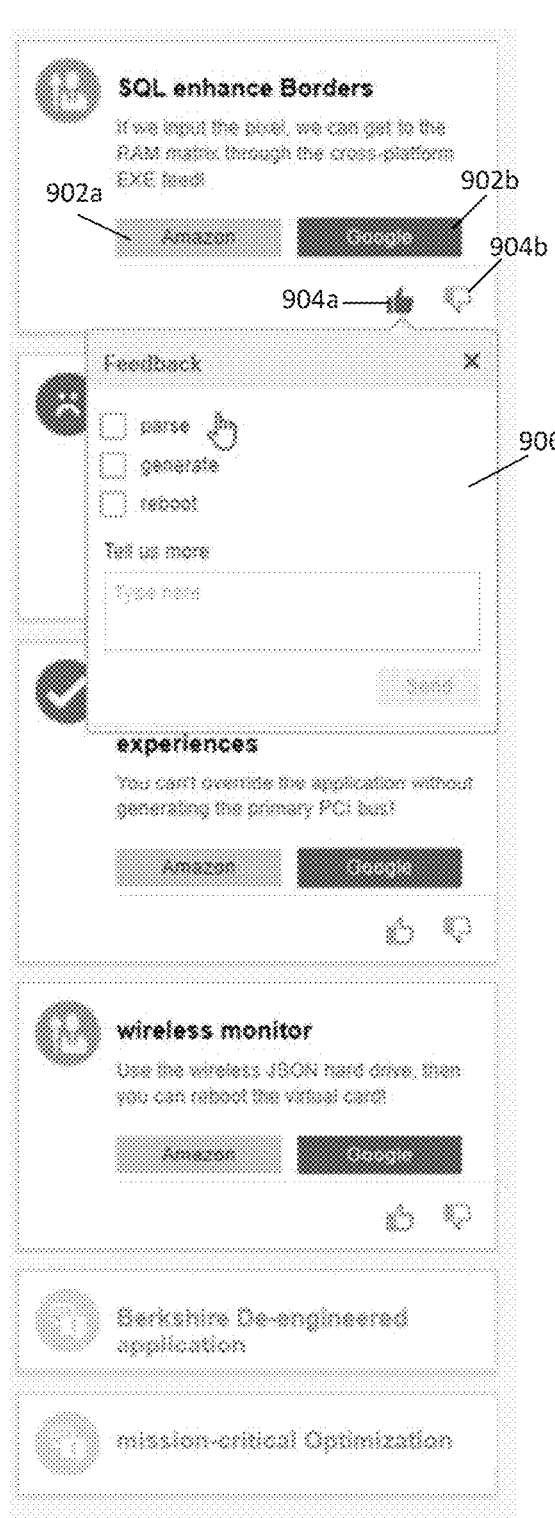

FIGS. 7, 8A, and 8B illustrate example user interface elements that populate the user interface of the client application 126 according to certain embodiments. FIGS. 9A and 9B illustrate an example user interface of the client application 126. FIG. 7 illustrates example icons that may be used to convey realtime contextual event messages according to certain embodiments. The icons are provided to enable the support agent to quickly identify a frame of reference for the displayed notification message. FIGS. 8A and 8B illustrate example notifications that may be presented in the user interface of the client application 126. The notifications utilize one of the icons of FIG. 7 together with a title (for example, Complaint, Long time to respond, Frustrated Customer, etc.) and an explanation or suggestion to the support agent to handle the cause of the notification.

FIG. 9A shows that the notifications may be stacked on top of each other in the user interface according to certain embodiments. The notifications may be closed (shown in gray) after being acted on by the support agent or after a period of time elapses. Buttons 902a, 902b are included such that the support agent may perform another action based on the notification (for example, look up a product at Amazon or Google). The user interface includes voting buttons 904a, 904b to enable the support agent to provide feedback about the notification. As shown in FIG. 9B, when the support agent presses the positive feedback button 904a, a dialog box 906 is displayed to enable the support agent to provide feedback through an action box and/or text box.

Figure 10:
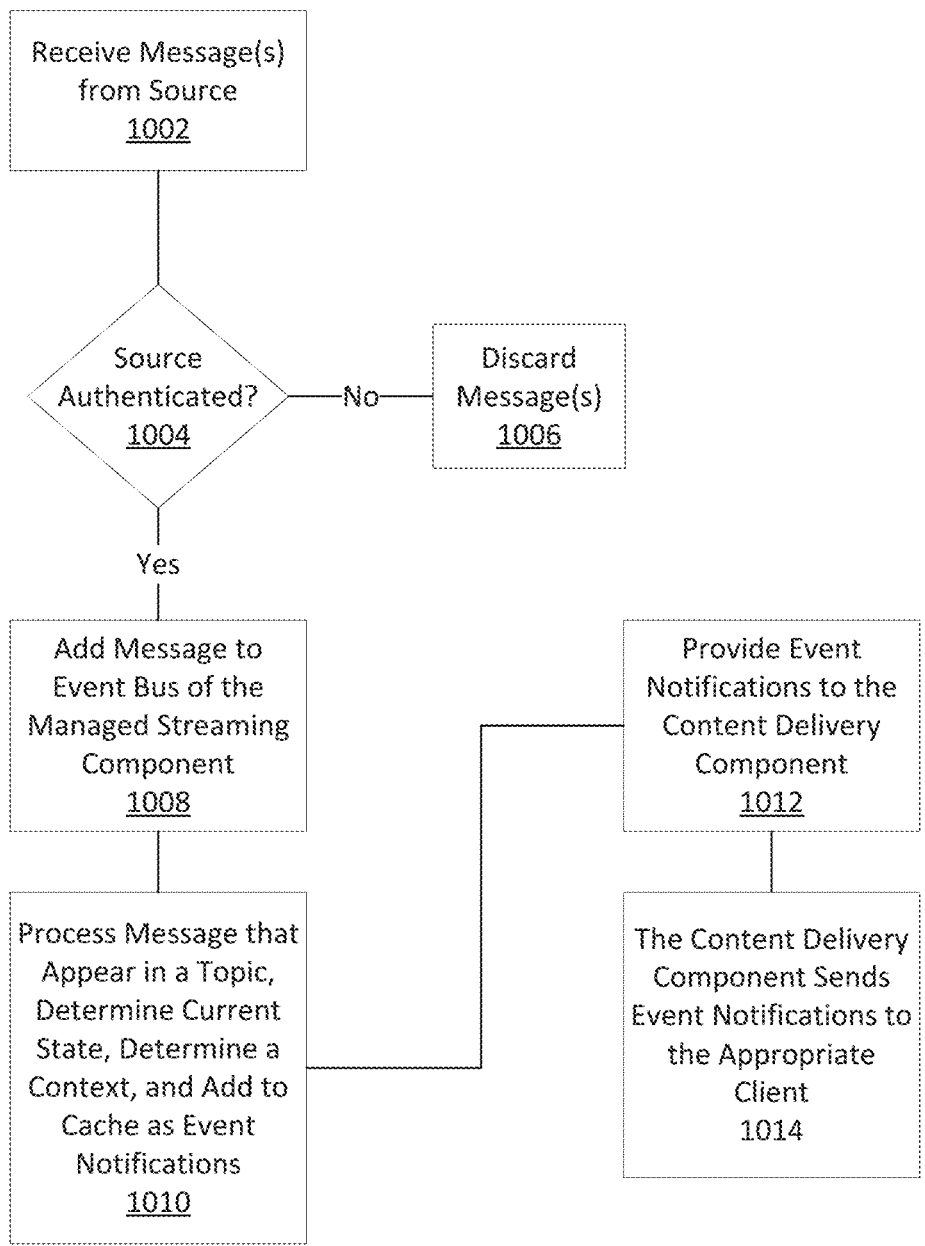
FIG. 10 illustrates an example flow diagram of operations performed by the realtime contextual event notification system according to certain embodiments.

FIG. 10 illustrates an example flow diagram of operations performed by the realtime contextual event notification system according to certain embodiments. At 1002, messages are received from a source. The recorder integration server 102 and/or cloud-based recorder 104 send messages to the API gateway component 106 that accepts application programming interface (API) calls over a socket connection from the recorder integration server 102 and/or cloud-based recorder 104.

At 1004, it is determined if the received message is authenticated. The messages included the token provided by the authentication component 108 and the RMS 110. If the message is not authenticated, it is discarded at 1006. If the message is authenticated, then at 1008, it is added to a message bus of the managed streaming component 114. Authenticated messages are forwarded from the API gateway component 106 to the notification API 112 that provides a RESTful API to connect the events to the event bus of the managed streaming component 114.

At 1010, the authenticated, received message is processed, a current state is determined, and it is added to a cache. The managed streaming component 114 processes messages that appear in the raw topic determine the current state of the call using the incoming events, determines a context (the state of the recipient and the circumstances that generated the notification) and updates/adds to the cache 116 with the most current event of the call(s), and adds event notifications to the processed topic as notification event(s) for consumption by the client management service (CMS) 120.

At 1012, the event notifications are provided to the CMS 120. The CMS consumes the notification event(s) and determines which attached client is the target for the message. At 1014, the CMS 120 sends the notification event(s) to the appropriate client that is the target the message. The CMS 120 is an API designed to wrap around Socket IO for the handling of the socket to setup easy-to-use commands to interact with the system 100 to receive/send events. The notification is presented in a user interface that is delivered by the content delivery component 122. The content delivery component 122 may be provided as JavaScript libraries that are interpreted by a plugin on a client application 126 (for example, a browser) executing on the client 124 to render the user interface. Target users connect to the realtime contextual event notification system 100 via a web application hosted in a native browser or desktop electron application.

Figure 11:
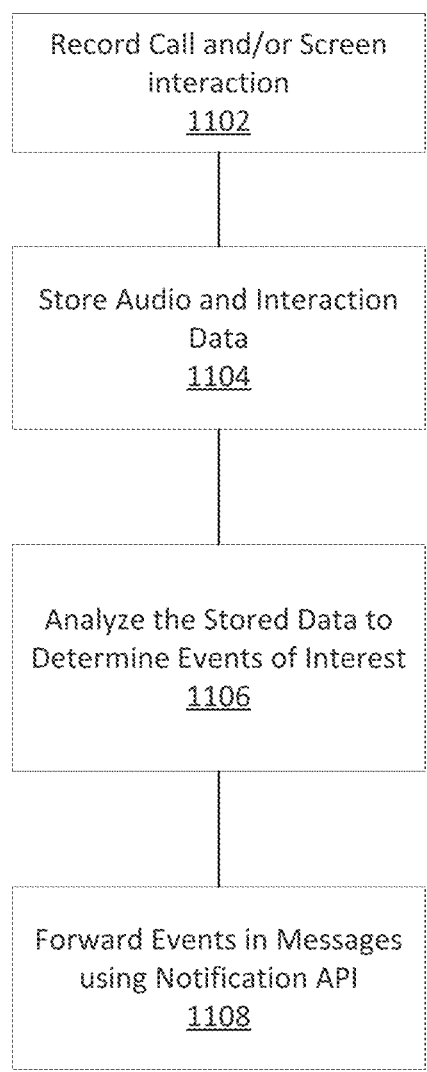
FIG. 11 illustrates an example flow diagram of operations performed by a source of data that is provided to the realtime contextual event notification system according to certain embodiments.

FIG. 11 illustrates an example flow diagram of operations performed by a source of data that is provided to the realtime contextual event notification system according to certain embodiments.

At 1102, the source records call and/or screen interactions between, for example, a customer and a support agent. As a customer conducts a voice communication session with an agent, the call recorder 202 records audio and screen interaction data to enable search, replay, and report on calls by topic. At 1104, the audio and interaction data is stored. The data may be stored at a Recoding Archive Service (RAS) 206.

At 1106, the stored data is analyzed to determine events of interest. The realtime analytics framework 210 may determine analytics events that are derived from acoustic analytics, linguistic analytics (for example, keywords and sentiment analysis from transcripts), biometric analytics (for example, does the person on the phone match a voice print), and desktop analytics. At 1108, the events are forwarded using the notification event API. A call may be made by the RAS 206 to the RMS 110, which is the endpoint for the socket.IO connections from the recorder integration servers 102 and/or cloud-based recorder 104.

Figure 12:
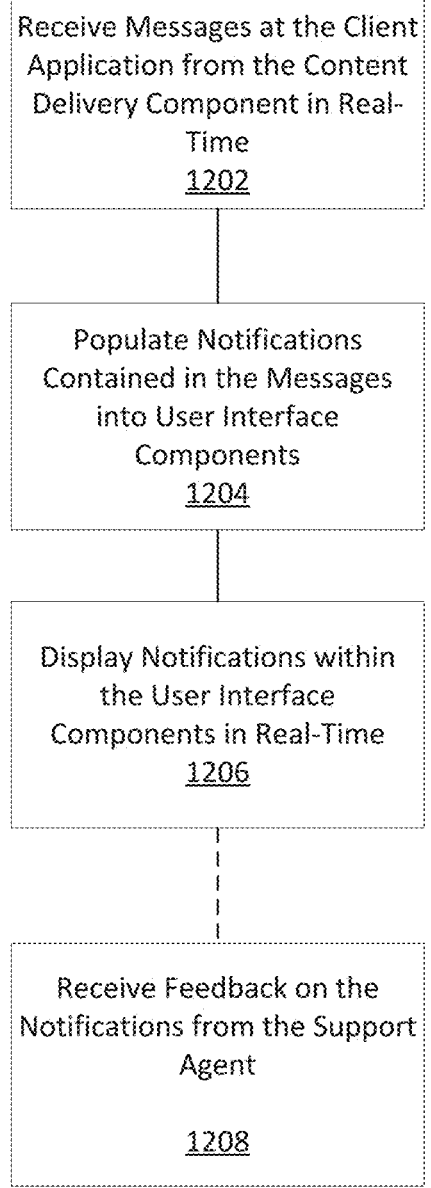
FIG. 12 illustrates an example flow diagram of operations performed by a client that receives targeted notifications from the realtime contextual event notification system according to certain embodiments.

FIG. 12 illustrates an example flow diagram of operations performed by a client that receives targeted notifications from the realtime contextual event notification system according to certain embodiments.

At 1202, messages are received by the client application from the CMS in realtime. The events are delivered to the client application 126 using the client API 412. At 1204, the notifications are populated into user interface components and at 1206, the notifications are displayed in the user interface. The client application 126 defines screen components, one of which is the CallMentoring screen 610 where notifications are displayed and managed by a support agent or other end-user.

Optionally or additionally at 1208, feedback on the notification from the support agent is received by the CMS. The user interface may include voting buttons 904a, 904b to enable the support agent to provide feedback about the notification.

EXAMPLE USE CASES

The Send events to work Assist desktop clients for notification of generated events from WFE/foundation notifications framework Send events to Work Assist desktop clients for notification of generated events from third-party event sources.

Figure 13:
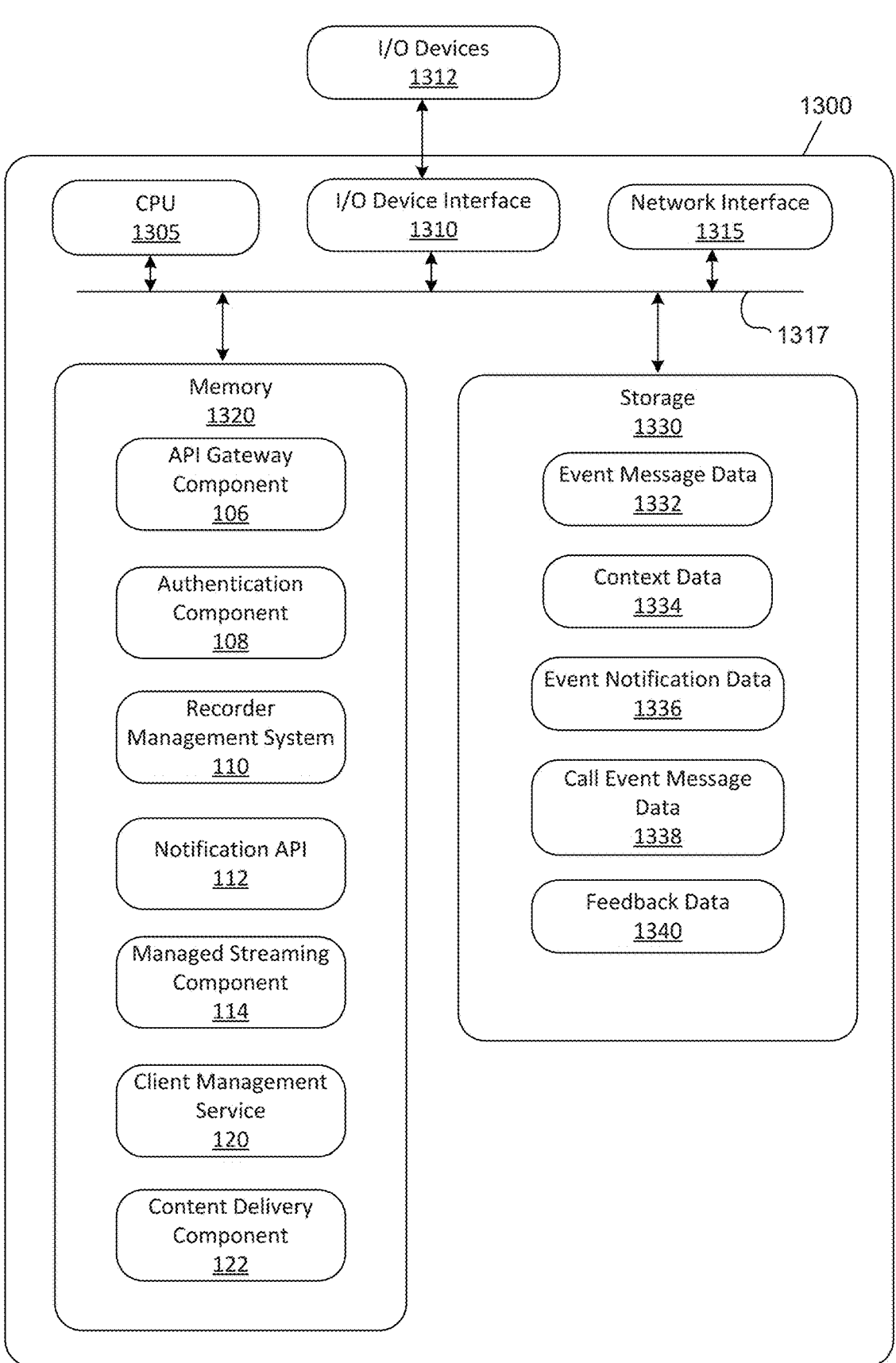
FIG. 13 is a schematic diagram of computer hardware that may be utilized to implement event notification processing in accordance with the disclosure according to certain embodiments.

FIG. 13 illustrates examples of computers 1300 that may include the kinds of software programs, data stores, and hardware that can implement event message processing, context determination, notification generation, and content delivery, as described above according to certain embodiments. As shown, the computing system 1300 includes, without limitation, a central processing unit (CPU) 1305, a network interface 1315, a memory 1320, and storage 1330, each connected to a bus 1317. The computing system 1300 may also include an I/O device interface 1310 connecting I/O devices 1312 (e.g., keyboard, display and mouse devices) to the computing system 1300. Further, the computing elements shown in computing system 1300 may correspond to a physical computing system (e.g., a system in a data center) or may be a virtual computing instance executing within a computing cloud. The CPU 1305 retrieves and executes programming instructions stored in the memory 1320 as well as stored in the storage 1330. The bus 1317 is used to transmit programming instructions and application data between the CPU 1305, I/O device interface 1310, storage 1330, network interface 1315, and memory 1320. Note, CPU 1305 is included to be representative of a single CPU, multiple CPUs, a single CPU having multiple processing cores, and the like, and the memory 1320 is generally included to be representative of a random access memory. The storage 1330 may be a disk drive or flash storage device. Although shown as a single unit, the storage 1330 may be a combination of fixed and/or removable storage devices, such as fixed disc drives, removable memory cards, optical storage, network attached storage (NAS), or a storage area-network (SAN).

Illustratively, the memory 1320 includes an API gateway component 106, an authentication component 108, a recorder management system 110, a notification API component 112, a managed streaming component 114, a client management system 114, and a content delivery component 122, all of which are discussed in greater detail above. Further, storage 1330 includes, event message data 1332, context data 1334, event notification data 1336, call event message data 1338, and feedback data 1340, all of which are also discussed in greater detail above.

It should be understood that the various techniques described herein may be implemented in connection with hardware components or software components or, where appropriate, with a combination of both. Illustrative types of hardware components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although certain implementations may refer to utilizing aspects of the presently disclosed subject matter in the context of one or more stand-alone computer systems, the subject matter is not so limited but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Thus, the realtime contextual event notification system 100 of the present disclosure ingests events as streams from any authorized entity, applies rules to the event streams, determines a context of a support agent, and blends the rules and context to provide notifications to the support agent in accordance with the context.

What is claimed:

1. A method of providing realtime contextual event notifications, comprising:

receiving, at an API gateway component, event messages from a source over a socket connection;

receiving, at a recorder management system, call event messages from the source, wherein the call event messages comprise application events and linguistic events;

forwarding, by the recorder management system, the event messages and the call event messages to a notification application programming interface (API) that provides a RESTful API to connect the event messages and the call event messages to a managed streaming component;

processing, at the managed streaming component, the event messages and the call event messages to determine a context including a condition of a user and a circumstance of a customer interaction to generate event notifications; and communicating event notifications to a client management service that determines a target client to receive the event notifications.

2. The method of claim 1, wherein the event messages comprise linguistic events and application events.

3. The method of claim 1, further comprising authenticating the event messages and the call event messages using a token that is contained within a header.

4. The method of claim 1, the processing further comprising:

determining a current state of a call associated with the event messages using the call event messages;

updating a cache with a most current event of the call; and adding the event notifications for consumption by the client management service for delivery to the target client.

5. The method of claim 1, further comprising receiving feedback on the event notifications from the target client.

6. The method of claim 1, further comprising:

receiving a connection from the target client; and sending scripting language code to the target client that defines a user interface.

7. The method of claim 1, further comprising:

receiving the event messages as parallel streams;

processing the parallel streams by topic; and determining the context in realtime as the parallel streams are received.

8. A computer system, comprising: a memory comprising computer-executable instructions; and a processor configured to execute the computer-executable instructions and cause the computer system to perform a method of providing realtime contextual event notifications, the computer system executing instructions to:

receive, at an API gateway component, event messages from a source over a socket connection;

receive, at a recorder management system, call event messages from the source, wherein the call event messages comprise application events and linguistic events;

forward, by the recorder management system, the event messages and the call event messages to a notification application programming interface (API) that provides a RESTful API to connect the event messages and the call event messages to a managed streaming component;

process, at the managed streaming component, the event messages and the call event messages to determine a context to generate event notifications; and communicate the event notifications to a client management service that determines a target client to receive the event notifications.

9. The computer system of claim 8, wherein the event messages comprise linguistic events and application events.

10. The computer system of claim 8, wherein the event messages and the call event messages are authenticated using a token that is contained within a header.

11. The computer system of claim 8, wherein a current state of a call associated with the event messages is determined using the call event messages, wherein a cache is updated with a most current event of the call, and wherein the event notifications are processed for consumption by the client management service for delivery to the target client.

12. The computer system of claim 8, wherein feedback on the event notifications is received from the target client.

13. The computer system of claim 8, wherein a connection is received from the target client, and wherein scripting language code that defines a user interface is sent to the target client.

14. The computer system of claim 8, wherein the event messages are received as parallel streams, wherein the parallel streams are processed by topic, and wherein the context is determined in realtime as the parallel streams are received.

15. A non-transitory computer readable medium comprising instructions that, when executed by a processor of a processing system, cause the processing system to perform a method of providing realtime contextual event notifications, comprising instructions to:

receive, at an API gateway component, event messages from a source over a socket connection;

receive, at a recorder management system, call event messages from the source, wherein the call event messages comprise application events and linguistic events;

forward, by the recorder management system, the event messages and the call event messages to a notification application programming interface (API) that provides a RESTful API to connect the event messages and the call event messages to a managed streaming component;

process, at the managed streaming component, the event messages and the call event messages to determine a context; and communicate event notifications to a client management service that determines a target client to receive the event notifications.

16. The non-transitory computer readable medium of claim 15, wherein the event messages comprise linguistic events and application events.

17. The non-transitory computer readable medium of claim 15, further comprising instructions to authenticate the event messages and the call event messages using a token that is contained within a header.

18. The non-transitory computer readable medium of claim 15, further comprising instructions to:

determine a current state of a call associated with the event messages using the call event messages;

update a cache with a most current event of the call; and add the event notifications for consumption by the client management service (CMS) for delivery to the target client.

* * * * *